(12) United States Patent
McFarland et al.

(10) Patent No.: US 10,876,920 B1
(45) Date of Patent: Dec. 29, 2020

(54) AUXILIARY AERIAL VEHICLES FOR FLOW CHARACTERIZATION

(71) Applicant: Amazon Technologies, Inc., Seattle, WA (US)

(72) Inventors: Christopher McFarland, Seattle, WA (US); David Moro-Ludena, Arlington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 171 days.

(21) Appl. No.: 16/143,162

(22) Filed: Sep. 26, 2018

(51) Int. Cl.
| | |
|---|---|
| B64C 27/52 | (2006.01) |
| B64C 39/02 | (2006.01) |
| G01M 9/06 | (2006.01) |
| B64F 5/60 | (2017.01) |
| B64D 43/00 | (2006.01) |

(52) U.S. Cl.
CPC ............ *G01M 9/065* (2013.01); *B64C 39/024* (2013.01); *B64F 5/60* (2017.01); *B64C 2201/12* (2013.01); *B64D 43/00* (2013.01)

(58) Field of Classification Search
CPC .... G08G 5/0069; G08G 5/045; G08G 5/0078; G08G 5/0056; G08G 5/0013; G08G 5/0039; G01S 11/12; G01S 13/933; G01S 7/484; G01S 7/4808; G01S 17/10; G01S 17/48; G01S 17/003; B64C 39/02; G05D 1/0808; G05D 1/042; G05D 1/0202; B64D 47/08
See application file for complete search history.

(56) References Cited

U.S. PATENT DOCUMENTS

| | | | |
|---|---|---|---|
| 2016/0240091 A1* | 8/2016 | Thiele | G08G 5/0065 |
| 2017/0162064 A1* | 6/2017 | Ubhi | B60L 8/003 |

\* cited by examiner

*Primary Examiner* — Brandi N Hopkins
(74) *Attorney, Agent, or Firm* — Athorus, PLLC

(57) ABSTRACT

Flow conditions affecting an aerial vehicle may be determined using one or more auxiliary aerial vehicles, which may be outfitted with one or more airspeed sensors and other systems for modeling air flow within a vicinity of the aerial vehicle. With the auxiliary aerial vehicles operating in selected positions or formations with respect to the aerial vehicle, the aerial vehicle may perform one or more testing evolutions requiring the operation of any propulsion motors, control surfaces or other systems. Flow conditions during the testing evolutions may be modeled based on data captured by sensors aboard the auxiliary aerial vehicles, and the modeled flow conditions may be used to determine whether the testing evolutions were successfully completed by the aerial vehicle.

20 Claims, 19 Drawing Sheets

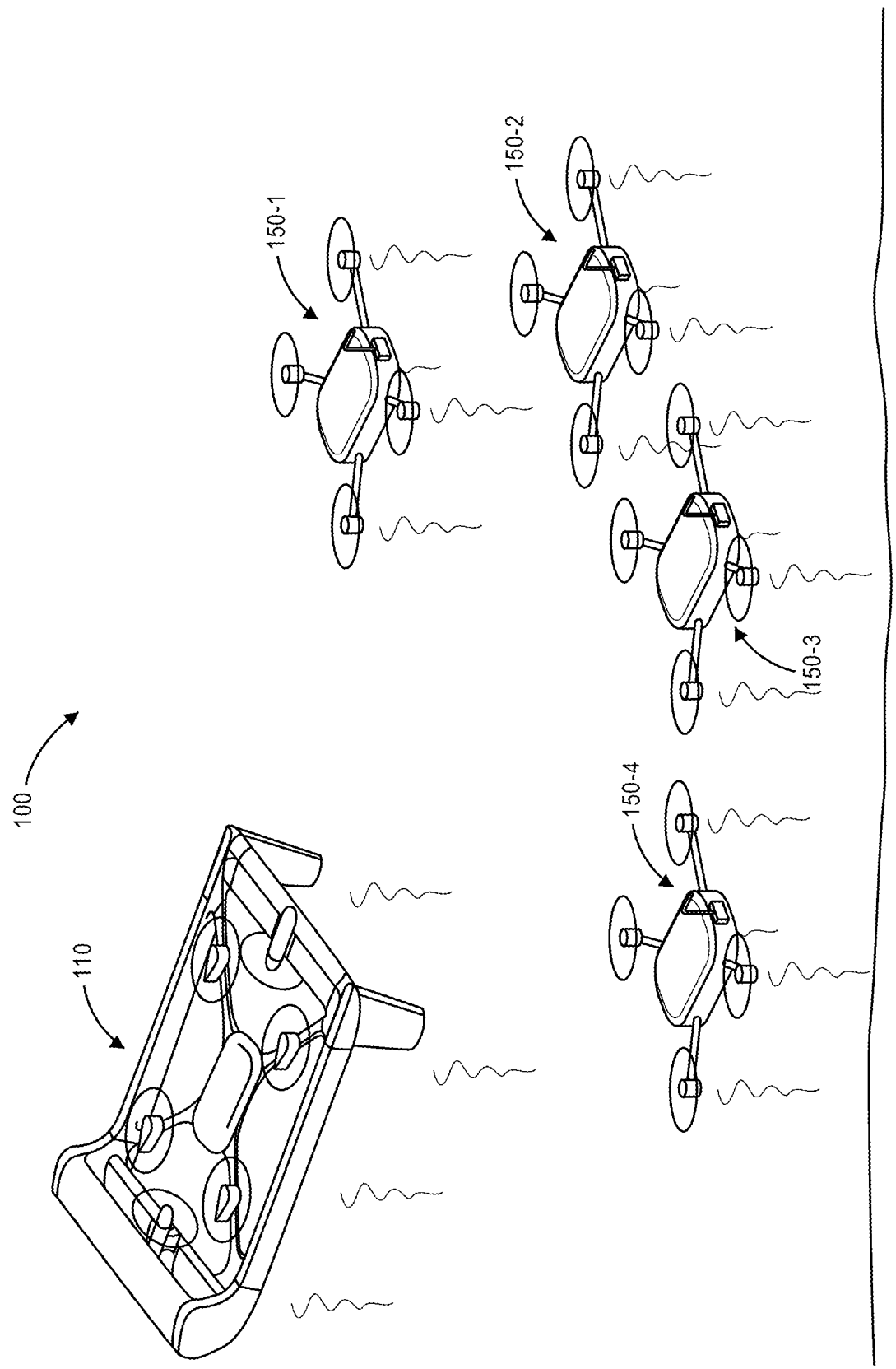

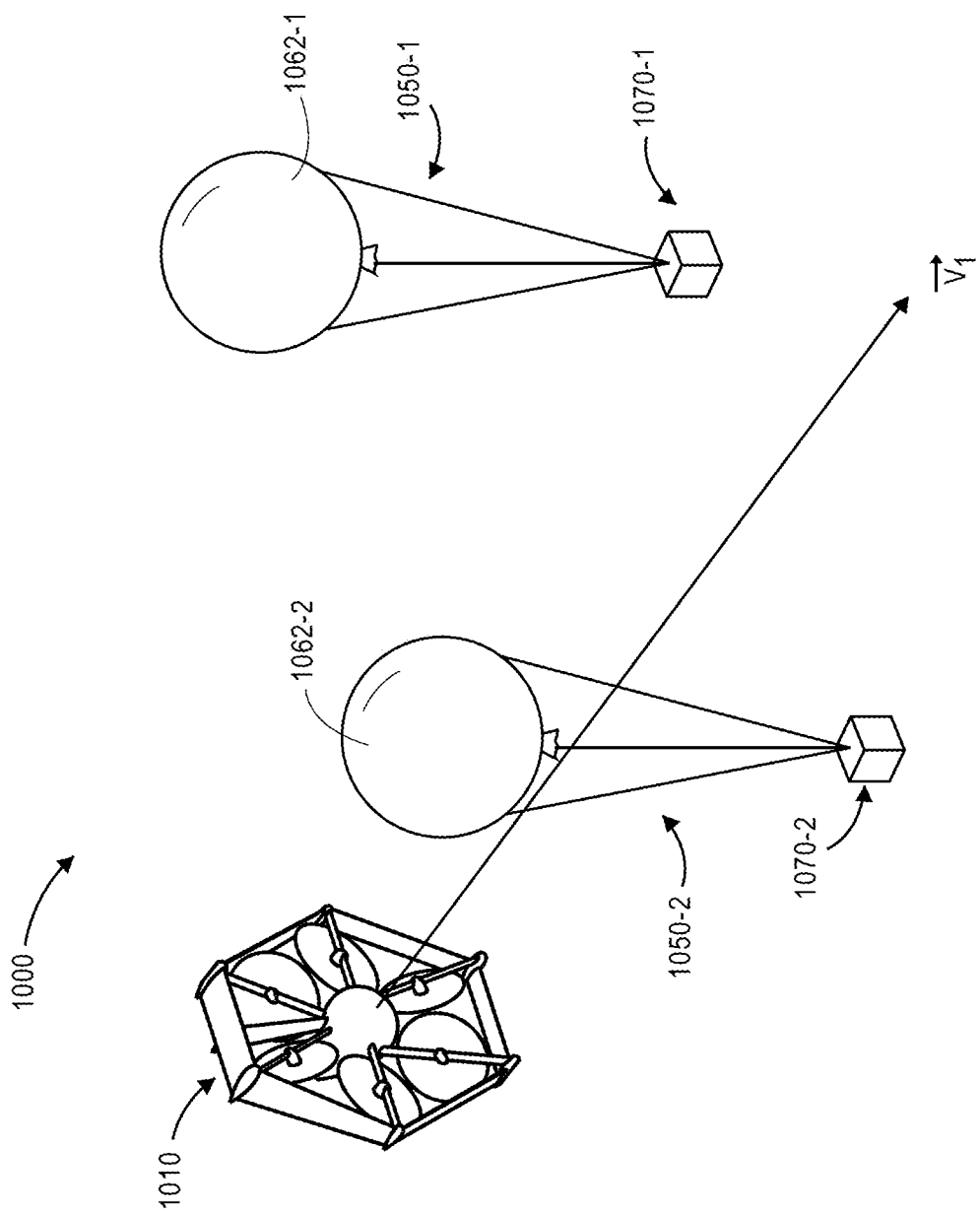

AUXILIARY AERIAL VEHICLES FOR FLOW CHARACTERIZATION

BACKGROUND

During airborne operations, an aerial vehicle may be subjected to forces generated by air flowing above, below and around the aerial vehicle in flight, including forces of thrust, lift, shear or drag. In many aerial vehicles, lift is generated when an airfoil passes through air, diverting the air and changing air pressure levels above and below the airfoil. Air flowing above an airfoil expands while flowing over the airfoil, and air flowing below the airfoil contracts, resulting in reduced air pressure above the airfoil and increased air pressure above the airfoil, and imparting forces upon the airfoil that tend to maintain the aerial vehicle aloft. Thus, the buoyancy of an aerial vehicle naturally depends on a variety of attributes regarding the air within which the aerial vehicle operates, including but not limited to velocities, pressures, densities, moisture content and material composition of the air.

Before a newly designed aerial vehicle may conduct airborne flight operations, the aerial vehicle must undergo a number of testing evolutions in order to confirm that the design of the aerial vehicle is both safe and airworthy. For example, in most jurisdictions, a newly designed aerial vehicle's sizing, electrical and power plant specifications must be evaluated in order to demonstrate that the aerial vehicle may take off, operate aloft and land reliably. In the United States, a proposed aerial vehicle must be designed on paper, e.g., based on estimated loading conditions that may be expected during flight, and its specifications evaluated, before conducting testing on the various details, systems and subsystems of the proposed aerial vehicle, constructing the aerial vehicle, and subjecting the aerial vehicle to in-flight tests at various altitudes, attitudes and velocities.

Traditionally, information or data regarding actual flow conditions encountered by an aerial vehicle during one or more operations may be obtained by temporarily outfitting the aerial vehicle with one or more sensors, or by subjecting the aerial vehicle to such flow conditions within a controlled environment, e.g., a wind tunnel. Where an aerial vehicle is temporarily outfitted with sensors for performing one or more evolutions, however, a mass and a shape of the aerial vehicle may be different during the evolutions than a mass or a shape of the aerial vehicle during standard flight operations without such sensors, which may potentially cause the aerial vehicle to respond differently to such flow conditions during such evolutions. Meanwhile, wind tunnels are expensive facilities that are constructed according to strict design requirements and include specialized equipment for performing any operational tests that may be desired. Many wind tunnels are of the "one-size-fits-all" variety, and are designed and built to accommodate the largest of objects or prototypes, and must include fans, turbines, motors, machinery, or other pressure sources for generating flows of air or other gases at desired velocities or pressures.

BRIEF DESCRIPTION OF THE DRAWINGS

FIGS. 1A through 1E are views of aspects of one system for using auxiliary aerial vehicles for flow characterization in accordance with embodiments of the present disclosure.

FIGS. 10A through 10C are views of aspects of one system for using auxiliary aerial vehicles for flow characterization in accordance with embodiments of the present disclosure.

DETAILED DESCRIPTION

As is set forth in greater detail below, the present disclosure is directed to systems and methods for using auxiliary aerial vehicles for characterizing flow. More specifically, one or more of the systems and methods of the present disclosure are directed to determining characteristics of flow above, below, forward of, aft of, or alongside an aerial vehicle, e.g., a main aerial vehicle, using one or more other aerial vehicles, e.g., auxiliary aerial vehicles, that are outfitted with one or more sensors or other systems. Information or data captured using sensors aboard the aerial vehicle, and aboard the one or more other aerial vehicles, may be analyzed in real time or near-real time, or at any other time, to generate a model of flow affecting the aerial vehicle, and to estimate a state of the aerial vehicle based at least in part on the model of the flow. In some embodiments, an aerodynamic model of the aerial vehicle may be generated based on the model of the flow, and may indicate a level of responsiveness or a measure of the behavior of the aerial vehicle within the presence of the flow. In some embodiments, performance of the aerial vehicle within the presence of the modeled flow may be compared to a previously generated aerodynamic model of the aerial vehicle in order to determine whether the performance of the aerial vehicle is satisfactory with respect to the previously generated aerodynamic model.

For example, where a main aerial vehicle is required to undergo a number of testing evolutions in order to confirm that the design of the main aerial vehicle is both safe and airworthy, or that one or more operations, maintenance evolutions or inspections of the aerial vehicle have been satisfactorily completed, a plurality of auxiliary aerial vehicles that are outfitted with airspeed sensors, accelerometers, gyroscopes, compasses or other systems may be programmed or configured to proceed to specific positions in three-dimensional space. The main aerial vehicle may then proceed to one or more specific positions, or to travel at one or more altitudes or velocities, to execute one or more maneuvers or other operations within a vicinity of the plurality of auxiliary aerial vehicles, which may capture information or data regarding flow conditions affecting the main aerial vehicle during operations. Such information or data may be used for any purpose, including but not limited to generating aerodynamic models of airspeeds, angles of attack, angles of sideslip, or forces or moments affecting the main aerial vehicle, or for any other purpose in connection with evaluating the performance of the main aerial vehicle during such operations.

Figure 1A:
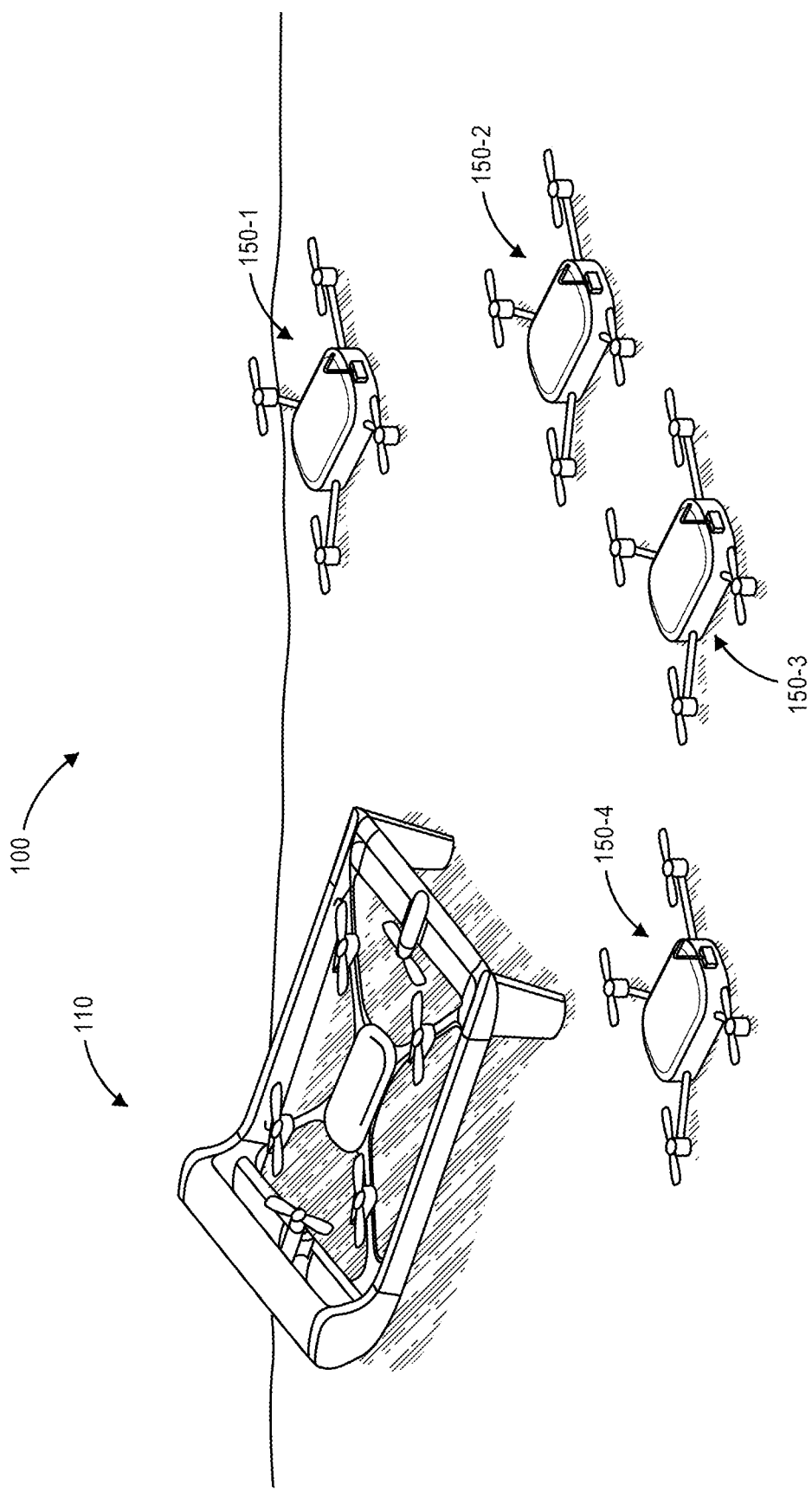

Referring to FIGS. 1A through 1E, views of aspects of one system 100 for using auxiliary aerial vehicles for flow characterization in accordance with embodiments of the present disclosure are shown. As is shown in FIG. 1A, the system 100 includes a main (or primary) aerial vehicle 110 and a plurality of auxiliary (or secondary) aerial vehicles 150-1, 150-2, 150-3, 150-4. The main aerial vehicle 110 may be any manned or unmanned aerial vehicle for which the characterization of flow conditions during one or more operations, e.g., flow conditions above, below, forward of, aft of or alongside the main aerial vehicle 110, is desired. Each of the auxiliary aerial vehicles 150-1, 150-2, 150-3, 150-4 is outfitted with one or more sensors or other systems for capturing information or data regarding such flow conditions over one or more periods of time. In addition to the main aerial vehicle 110 and the auxiliary aerial vehicles 150-1, 150-2, 150-3, 150-4, the system 100 may further include any number of additional main aerial vehicles or auxiliary aerial vehicles (not shown).

Figure 1B:
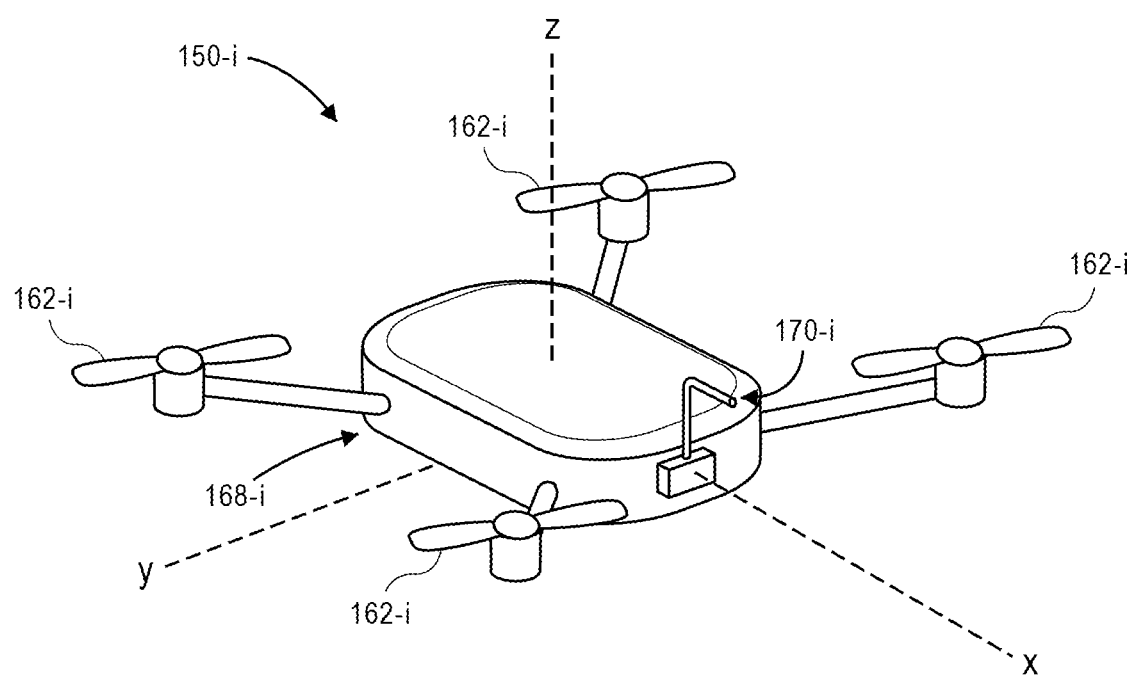

As is shown in FIG. 1B, an auxiliary aerial vehicle 150-$i$ is shown. The auxiliary aerial vehicle 150-$i$ is a representative one of the auxiliary aerial vehicles 150-1, 150-2, 150-3, 150-4. The auxiliary aerial vehicle 150-$i$ includes a plurality of propulsion motors (viz., four propulsion motors) 162-$i$, a motion sensor 168-$i$ and an airspeed sensor 170-$i$. The propulsion motors 162-$i$ may be any type or form of motor (e.g., electric, gasoline-powered or any other type of motor) capable of generating sufficient rotational speeds for one or more propellers or other components to provide lift and/or thrust forces to the auxiliary aerial vehicle 150-$i$. The motion sensor 168-1 may be any device or system such as an accelerometer, a gyroscope, a compass or the like for determining accelerations, velocities or orientations of the auxiliary aerial vehicle 150-$i$ in or more directions in three-dimensional space, viz., along or about x-, y- or z-directions or axes. The airspeed sensor 170-$i$ may be any type or form of anemometer or other device or system for determining speeds and/or directions (e.g., velocities) of wind flow. The airspeed sensor 170-$i$ may include one or more pitot tubes, ultrasonic transmitters and/or receivers or other components, and may operate independently or in pairs. The auxiliary aerial vehicle 150-$i$ may further include any number of additional sensors (not shown).

Aerial vehicles of the present disclosure may be programmed or configured to perform one or more evolutions at one or more selected altitudes, velocities or attitudes, or the operation of one or more control systems for achieving such altitudes, velocities or attitudes, during which one or more maneuvers or other actions may be executed by the aerial vehicle at various times. One or more other aerial vehicles may be further configured to operate in support of such evolutions, and to capture information or data regarding actual flow conditions within a vicinity of the aerial vehicle that is performing the evolutions within one or more intervals or periods of time during which such maneuvers or other actions are performed. As is shown in FIG. 1C, the main aerial vehicle 110 and the auxiliary aerial vehicles 150-1, 150-2, 150-3, 150-4 may be programmed to take off and proceed to selected positions in three-dimensional space, e.g., altitudes above selected geolocations, and to operate in accordance with a selected evolution.

Figure 1D:
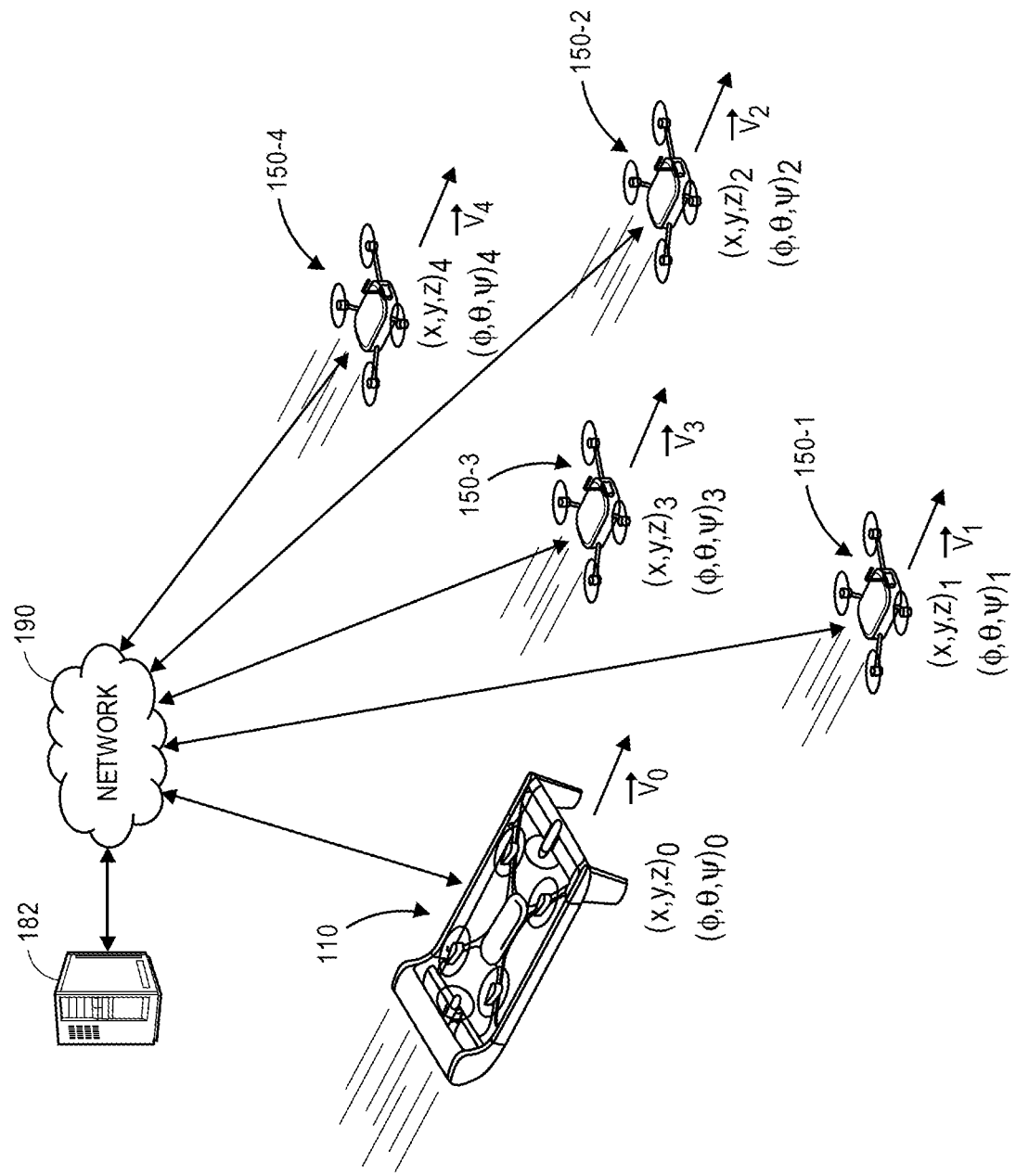

As is shown in FIG. 1D, the main aerial vehicle 110 reaches a position $(x, y, z)_0$ and is traveling at a velocity (e.g., on a course and at a speed) $V_0$. The position $(x, y, z)_0$ and the velocity $V_0$ may be selected in accordance with any type or form of evolutions, e.g., operations, maintenance or inspections, during which the main aerial vehicle 110 may operate any propulsion motors to rotate propellers at any selected speeds, operate any control surfaces to a selected angle or position within a predetermined range or extent, or extend or retract any appurtenances or other features such as landing gear, antennas, engagement systems or the like. Additionally, the evolutions may further evaluate the capacity or ability of a control system to maintain the main aerial vehicle 110 at a selected altitude, over a selected position, on a selected course or at a selected speed.

As is also shown in FIG. 1D, the auxiliary aerial vehicle 150-1 reached a position $(x, y, z)_1$ and is traveling at a velocity $V_1$, while the auxiliary aerial vehicle 150-2 reached a position $(x, y, z)_2$ and is traveling at a velocity $V_2$, the auxiliary aerial vehicle 150-3 reached a position $(x, y, z)_3$ and is traveling at a velocity $V_3$ and the auxiliary aerial vehicle 150-4 reached a position $(x, y, z)_4$ and is traveling at a velocity $V_4$. The positions $(x, y, z)_1$, $(x, y, z)_2$ of the auxiliary aerial vehicles 150-1, 150-2 are forward of the position $(x, y, z)_0$ of the main aerial vehicle 110, and at lower altitudes than the position $(x, y, z)_0$ of the main aerial vehicle 110. The positions $(x, y, z)_3$, $(x, y, z)_4$ of the auxiliary aerial vehicles 150-3, 150-4 are also forward of the position $(x, y, z)_0$ of the main aerial vehicle 110, but at higher altitudes than the position $(x, y, z)_0$ of the main aerial vehicle 110. The positions $(x, y, z)_1$, $(x, y, z)_3$ of the auxiliary aerial vehicles 150-1, 150-3 are to the starboard sides of the position $(x, y, z)_0$ of the main aerial vehicle 110, while the positions $(x, y, z)_2$, $(x, y, z)_4$ of the auxiliary aerial vehicles 150-2, 150-4 are to the port side of the position $(x, y, z)_0$ of the main aerial vehicle 110. Additionally, the main aerial vehicle 110 is in an orientation $(\phi, \theta, \omega)_0$, e.g., at a roll angle $\phi$ about the roll axis (or x-axis), a pitch angle $\theta$ about the pitch axis (or y-axis) or a yaw angle $\psi$ about the yaw axis (or z-axis), during the evolutions in response to the flow of air, and the auxiliary aerial vehicles 150-1, 150-2, 150-3, 150-4 are in orientations $(\phi, \theta, \omega)_1$, $(\phi, \theta, \omega)_2$, $(\phi, \theta, \omega)_3$, $(\phi, \theta, \omega)_4$.

As is further shown in FIG. 1D, while in the respective positions $(x, y, z)_1$, $(x, y, z)_2$, $(x, y, z)_3$, $(x, y, z)_4$, and the respective orientations $(\phi, \theta, \omega)_1$, $(\phi, \theta, \omega)_2$, $(\phi, \theta, \omega)_3$, $(\phi, \theta, \omega)_4$, the auxiliary aerial vehicles 150-1, 150-2, 150-3, 150-4 may capture any information or data regarding flow conditions within a vicinity of the position $(x, y, z)_0$ of the main aerial vehicle 110, including but not limited to airspeeds and directions of flows of air, as well as temperatures, barometric pressures, humidities of the air, or concentrations of one or more particulates within the air. The auxiliary aerial vehicles 150-1, 150-2, 150-3, 150-4 may further capture any additional information or data regarding an environment within the vicinity of the main aerial vehicle 110, including but not limited to prevailing weather conditions, sunlight or cloud cover, air traffic or ground conditions. The information or data captured by the auxiliary aerial vehicles 150-1, 150-2, 150-3, 150-4 may be of any type of form, including but not limited to digital data, imaging data, or any other type or form.

The position $(x, y, z)_0$ of the main aerial vehicle 110 and the positions $(x, y, z)_1$, $(x, y, z)_2$, $(x, y, z)_3$, $(x, y, z)_4$ of the auxiliary aerial vehicles 150-1, 150-2, 150-3, 150-4 may be selected in any manner and as required by one or more evolutions. The position $(x, y, z)_0$ and the positions $(x, y, z)_1$, $(x, y, z)_2$, $(x, y, z)_3$, $(x, y, z)_4$ may be determined or defined in an absolute sense, e.g., with respect to an altitude above a geolocation identified by a latitude and a longitude, or in a relative sense, e.g., with respect to a selected distance from one another in any selected direction or orientation. Moreover, one or more of the position $(x, y, z)_0$ or the positions $(x, y, z)_1$, $(x, y, z)_2$, $(x, y, z)_3$, $(x, y, z)_4$ may be described as functions of time, e.g., where the main aerial vehicle 110 or one or more of the auxiliary aerial vehicles 150-1, 150-2, 150-3, 150-4 is to be in motion during one or more evolutions.

As is shown in FIG. 1D, each of the main aerial vehicle 110 and the auxiliary aerial vehicles 150-1, 150-2, 150-3, 150-4 is in communication with a server 182 over a network 190. In some embodiments, the server 182 may be associated with a facility for testing aerial vehicles including but not limited to the main aerial vehicle 110 or the auxiliary aerial vehicles 150-1, 150-2, 150-3, 150-4, a facility configured for take-offs or landings of aerial vehicles, or any other facility associated with the use and operation of aerial vehicles, such as a fulfillment center. The main aerial vehicle 110 or the auxiliary aerial vehicles 150-1, 150-2, 150-3, 150-4 may transmit any information or data captured during the evolutions to the server 182, or receive one or more instructions regarding the evolutions or any other operations from the server 182.

Figure 1E:
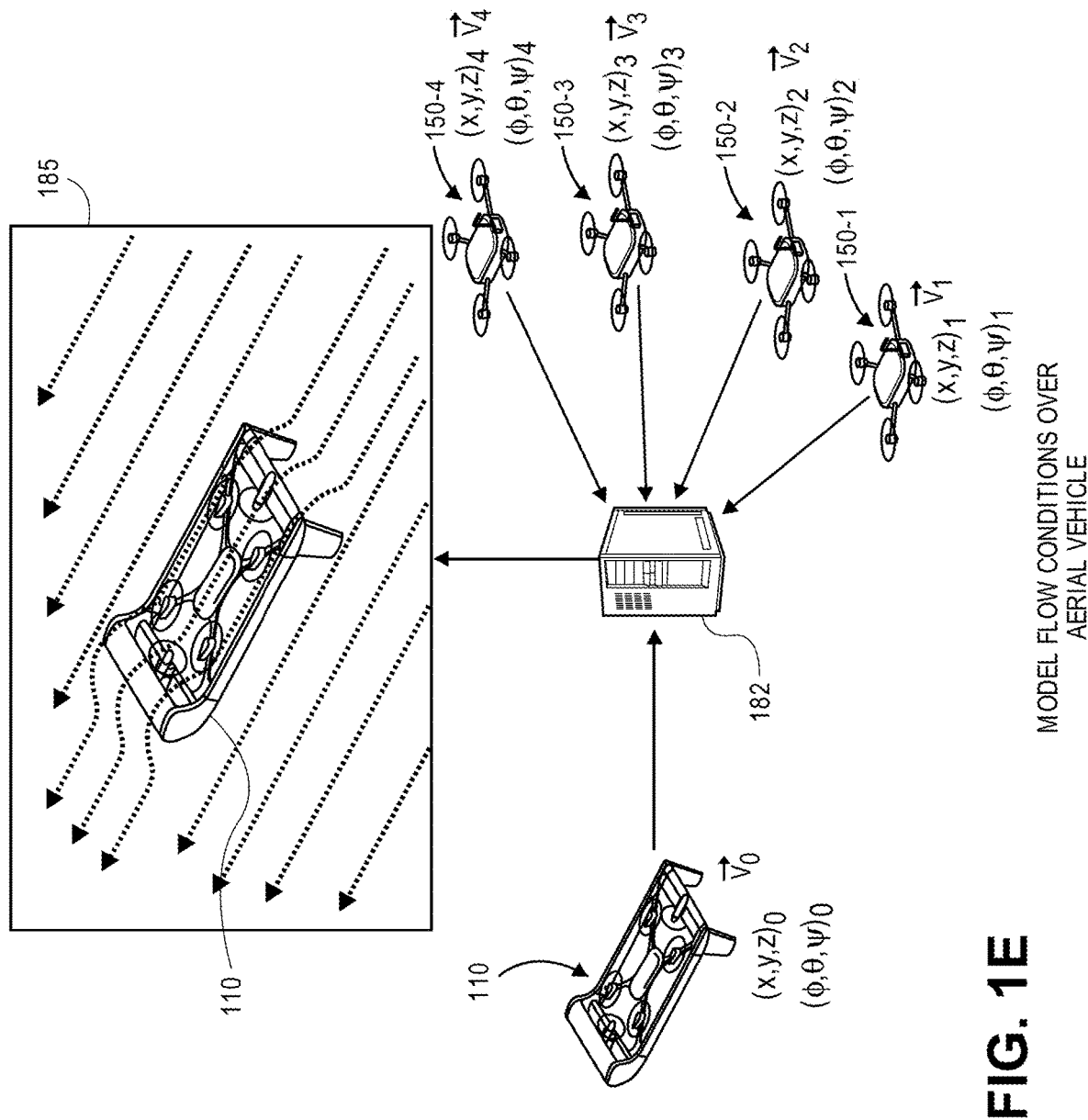

As is shown in FIG. 1E, based on information or data received from the main aerial vehicle 110 and the auxiliary aerial vehicles 150-1, 150-2, 150-3, 150-4 within intervals or periods of time during which the evolutions were performed, the server 182 may generate a model 185 of flow conditions affecting the main aerial vehicle 110 during the evolutions. In some embodiments, the model 185 may be generated based at least in part on information or data regarding the positions $(x, y, z)_0$ of the main aerial vehicle 110 during the evolutions, or the orientations of the main aerial vehicle 110 about the roll axis (or x-axis), the pitch axis (or y-axis) or the yaw axis (or z-axis), e.g., roll angles $\phi$, pitch angles $\theta$ or yaw angles $\omega$ of the main aerial vehicle 110, or $(\phi, \theta, \omega)_0$, of the main aerial vehicle 110 during the evolutions in response to the flow of air. In some embodiments, the model 185 may be generated based at least in part on information or data regarding actions taken by the main aerial vehicle 110 to maintain the main aerial vehicle 110 in a selected position $(x, y, z)_0$ or a selected orientation $(\phi, \theta, \omega)_0$ in the presence of the flow.

In some embodiments, the model 185 may also be derived based on information or data regarding the positions $(x, y, z)_1$, $(x, y, z)_2$, $(x, y, z)_3$, $(x, y, z)_4$ of the auxiliary aerial vehicles 150-1, 150-2, 150-3, 150-4, or the orientations $(\phi, \theta, \omega)_1$, $(\phi, \theta, \omega)_2$, $(\phi, \theta, \omega)_3$, $(\phi, \theta, \omega)_4$ of the auxiliary aerial vehicles 150-1, 150-2, 150-3, 150-4 during intervals or periods of time in which the evolutions were performed, in response to the flow of air. In some embodiments, the model 185 may be generated based at least in part on information or data regarding actions taken by each of the auxiliary aerial vehicles 150-1, 150-2, 150-3, 150-4 to maintain the main aerial vehicle 110 in selected positions $(x, y, z)_1$, $(x, y, z)_2$, $(x, y, z)_3$, $(x, y, z)_4$ or the orientations $(\phi, \theta, \omega)_1$, $(\phi, \theta, \omega)_2$, $(\phi, \theta, \omega)_3$, $(\phi, \theta, \omega)_4$ in the presence of the flow.

Alternatively, in some embodiments, each of the main aerial vehicle 110 and the auxiliary aerial vehicles 150-1, 150-2, 150-3, 150-4 may be configured to communicate with one another in a server-free manner, e.g., to exchange data regarding the performance of evolutions by the main aerial vehicle 110 or flow conditions sensed by the auxiliary aerial vehicles 150-1, 150-2, 150-3, 150-4, and the use of a separate server, viz., the server 182, to generate the model 185 need not be required. In such embodiments, the model 185 or any other report or representation of flow conditions may be generated by one or more computer processors or systems provided aboard the main aerial vehicle 110 or any of the auxiliary aerial vehicles 150-1, 150-2, 150-3, 150-4.

The model 185 may include information regarding the flow of air during intervals or periods of time during which the evolutions were performed, including velocities, directions, pressures, temperatures or other physical characteristics of the flow of air within a three-dimensional volume that includes the position $(x, y, z)_0$, or any other positions of the main aerial vehicle 110 during the evolutions. For example, the model 185 may determine or predict aerodynamic pressures applied to the main aerial vehicle 110 by the flow of air as functions of density, velocity, or one or more other factors or variables. Using the model 185, an aerodynamic model of airspeeds, angles of attack, angles of sideslip, or forces or moments applied to the main aerial vehicle 110 may be calculated and used to determine whether the main aerial vehicle 110 satisfactorily completed the one or more evolutions and may be cleared for further flight operations, or whether any additional maintenance, inspection or testing is required.

Accordingly, the systems and methods of the present disclosure may utilize information or data captured by auxiliary aerial vehicles within a vicinity of an aerial vehicle engaged in one or more evolutions to determine one or more characteristics of flow within the vicinity of the aerial vehicle. A model of the flow determined based on such characteristics may be used for any purpose in accordance with the present disclosure, including but not limited to estimating the state of an aerial vehicle based at least in part on flows affecting the aerial vehicle, or to determine a level of responsiveness of the aerial vehicle to such flows. For example, one or more embodiments of the present disclosure may be utilized to model airspeeds, angles of attack, angles of sideslip, or forces or moments affecting the aerial vehicle, to determine whether one or more selected evolutions were satisfactorily performed by the aerial vehicle, or whether the aerial vehicle requires further maintenance operations, modifications or inspections.

Information or data captured using sensors carried aboard auxiliary aerial vehicles during the operation of another aerial vehicle, or models of flow conditions generated based on such information or data, may be utilized for any purpose in accordance with the present disclosure. For example, in some embodiments, an aerial vehicle that is subjected to testing or evaluation may be placed in a variety of different states or modes of operation, in order to determine how flows of air affect the aerial vehicle in such states or modes of operation. Information or data captured by sensors aboard the aerial vehicle, and sensors aboard one or more auxiliary aerial vehicles placed in selected positions with respect to the aerial vehicle may be stored in one or more data stores (e.g., logged and time-stamped). The information or data captured by the aerial vehicle, and the auxiliary aerial vehicles, may be synchronized and processed in order to generate a model of aerodynamic performance within the presence of such flows by the aerial vehicle, or to determine whether the aerodynamic performance of the aerial vehicle complies with any previously generated models. For example, in some embodiments, one or more regressions may be performed on the information or data, e.g., to filter or remove noise or other irrelevant data therefrom. The information or data may be processed to estimate speeds and directions of air flows at discrete points in space where the auxiliary aerial vehicles were located, thereby utilizing the specific biases or behaviors of the respective auxiliary aerial vehicles within the presence of such flows to construct one or more models or profiles of the flow.

In some embodiments, a model of flow conditions may be used to determine whether an aerial vehicle in general, or a propulsion motor, a control surface or an appurtenance or other feature of the aerial vehicle in particular, is properly operating in the presence of such flow. In some embodiments, models of flow conditions may be utilized in connection with information or data captured by one or more sensors aboard an aerial vehicle regarding signals generated by an inertial navigation system, actions undertaken by a control system in response to such signals, or any other response by the inertial navigation system or the control system. The models may be used to determine whether the signals generated by the inertial navigation system or the actions undertaken by the control system in response to such signals were appropriate in view of the actual flow conditions, or whether further inspection, calibration or evaluation may be required.

One or more of the systems and methods disclosed herein may be utilized to determine flow conditions in association with the performance of any number of evolutions. For example, information or data captured using sensors provided aboard one or more auxiliary aerial vehicles, or flow conditions that are modeled based on such information or data, may be used to determine whether a main aerial vehicle has complied with a flight maneuvering envelope, or a V-n diagram, e.g., a plot of velocity versus a load factor, or to calculate pressure differentials across surfaces of the main aerial vehicle during the performance of one or more testing evolutions. Information or data captured using sensors provided aboard one or more auxiliary aerial vehicles, or flow conditions that are modeled based on such information or data, may also be used to perform periodic maintenance on a main aerial vehicle, e.g., one or more regular, periodic or unplanned inspections, such as those outlined or described in Title 14, Part 43 of the Code of Federal Regulations. Moreover, one or more embodiments of the systems and methods disclosed herein may be used to determine flow conditions in association with the performance of any number of testing evolutions by a main aerial vehicle that is either manned or unmanned.

The systems and methods of the present disclosure enable actual flow conditions over surfaces of an aerial vehicle to be determined or computed without having to affix additional sensors to the aerial vehicle, and without having to perform testing evolutions in a secure facility such as a wind tunnel. Outfitting an aerial vehicle with additional sensors provided at locations where accurate determinations of flow conditions are desired necessarily varies the mass and shape of the aerial vehicle, which may have adverse effects on its aerodynamic performance within the presence of such flows, or may result in measurements that are different from actual flow conditions that may be expected when such sensors are not mounted to the aerial vehicle. Furthermore, performing testing evolutions on an aerial vehicle within a wind tunnel is typically an expensive process that places burdens on a number of human operators and other systems.

The systems and methods of the present disclosure may be used to characterize or otherwise model flow conditions affecting any type or form of aerial vehicle (e.g., a main aerial vehicle), during the performance of any type or form of evolutions, using information or data captured by any type or form of other aerial vehicles (e.g., auxiliary aerial vehicles). For example, in accordance with the present disclosure, one or more of the aerial vehicles disclosed herein may be a fixed-wing aircraft, or a rotary wing aircraft such as a quad-copter (e.g., a helicopter having four rotatable propellers), an octo-copter (e.g., a helicopter having eight rotatable propellers) or any other vertical take-off and landing (or VTOL) aircraft having one or more propellers. Alternatively, the aerial vehicles of the present disclosure may be configured for operation with or without wings, and with or without one or more propulsion motors (e.g., a glider or lighter-than-air craft, such as a dirigible). One or more of the aerial vehicles disclosed herein may be configured for operation in vertical flight operations, horizontal (or forward) flight operations, hovering flight operations, or any other flight operations in accordance with the present disclosure.

Figure 2A:
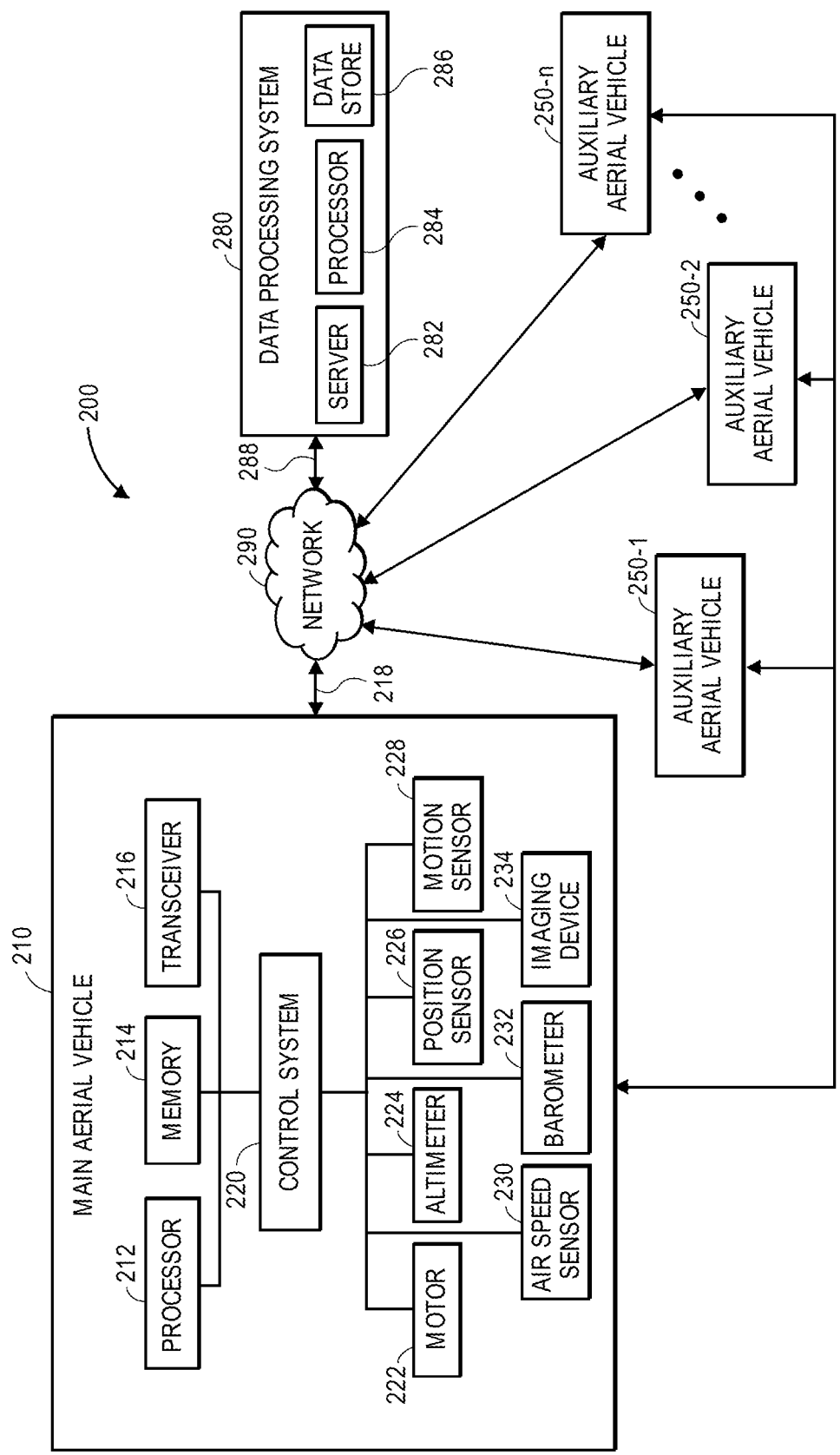
FIGS. 2A and 2B are block diagrams of one system for using auxiliary aerial vehicles for flow characterization in accordance with embodiments of the present disclosure.
Figure 2B:
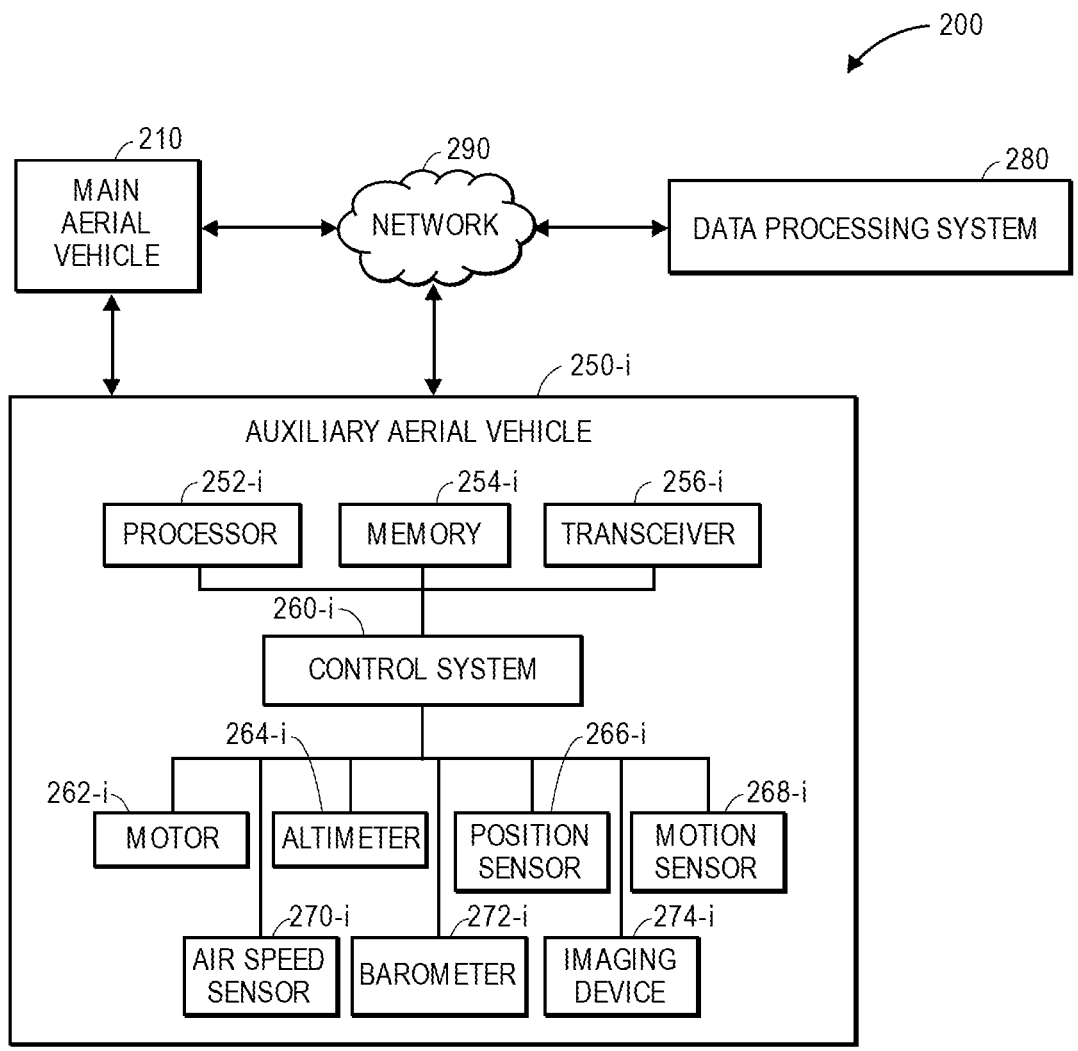

Referring to FIGS. 2A and 2B, a block diagram of one system 200 for using auxiliary aerial vehicles for flow characterization in accordance with embodiments of the present disclosure is shown. The system 200 of FIGS. 2A and 2B includes a main aerial vehicle 210, a plurality of auxiliary aerial vehicles 250-1, 250-2 . . . 250-$n$ and a data processing system 280 connected to one another over a network 290, which may include the Internet, in whole or in part. Except where otherwise noted, reference numerals preceded by the number "2" shown in FIGS. 2A and 2B indicate components or features that are similar to components or features having reference numerals preceded by the number "1" shown in FIGS. 1A through 1E.

The main aerial vehicle 210 includes a processor 212, a memory 214 and a transceiver 216. The main aerial vehicle 210 further includes a control system 220, a plurality of propulsion motors 222, an altimeter 224, a position sensor 226 and a motion sensor 228. The main aerial vehicle 210 also includes an airspeed sensor 230, a barometer 232 and an imaging device 234.

The processor 212 may be configured to perform any type or form of computing function associated with the operation of the main aerial vehicle 210, including but not limited to the execution of one or more machine learning algorithms or techniques. The processor 212 may also be configured to execute any other algorithms or techniques (e.g., object detection or recognition algorithms or techniques) associated with one or more applications, purposes or functions, e.g., to select at least one of a course, a speed or an altitude for the safe operation of the main aerial vehicle 210. For example, the processor 212 may be configured to control any aspects of the operation of the main aerial vehicle 210 and the one or more computer-based components thereon, including but not limited to the propulsion motors 222, the altimeter 224, the position sensor 226, the motion sensor 228, the airspeed sensor 230, the barometer 232 and/or the imaging device 234. For example, the processor 212 may control the operation of one or more control systems or modules, such as the control system 220, for generating instructions for conducting operations of one or more of the propulsion motors 222, the altimeter 224, the position sensor 226, the motion sensor 228, the airspeed sensor 230, the barometer 232 and/or the imaging device 234. Such control systems or modules may be associated with one or more other computing devices or machines, and may communicate with the auxiliary aerial vehicles 250-1, 250-2 . . . 250-$n$ and/or the data processing system 280 or one or more other computer devices (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the main aerial vehicle 210 further includes one or more memory or storage components 214 (such as databases or data stores) for storing any type of information or data, e.g., instructions for operating the main aerial vehicle 210, or information or data captured during operations of the main aerial vehicle 210. For example, the memory 214 may be configured to store one or more sets of instructions for performing one or more testing evolutions, which may require executing one or more maneuvers, operating one or more of the propulsion motors 222 at selected speeds, operating one or more control surfaces (not shown), extending or retracting any appurtenances or other features (e.g., landing gear, antennas, engagement systems or the like). The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the main aerial vehicle 210 to communicate through one or more wired or wireless means, e.g., wired technologies such as Universal Serial Bus (or "USB") or fiber optic cable, or standard wireless protocols or standards such as any Bluetooth® or Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the main aerial vehicle 210, with one or more of the auxiliary aerial vehicles 250-1, 250-2 . . . 250-n, with the data processing system 280, or with one or more other computer devices or systems (e.g., other aerial vehicles, not shown) via the network 290, or directly. For example, in some embodiments, the transceiver 216 may be configured to coordinate I/O traffic between the processor 212 and one or more onboard or external computer devices or components, e.g., the propulsion motors 222, the altimeter 224, the position sensor 226, the motion sensor 228, the airspeed sensor 230, the barometer 232 and/or the imaging device 234. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the main aerial vehicle 210, as desired. For example, the control system 220 may be configured to cause or control the operation of one or more of the propulsion motors 222, the altimeter 224, the position sensor 226, the motion sensor 228, the airspeed sensor 230, the barometer 232 and/or the imaging device 234. The control system 220 may further control any other aspects of the main aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 222 may be any type or form of motor (e.g., electric, gasoline-powered or any other type of motor) capable of generating sufficient rotational speeds of one or more propellers or other components to provide lift and/or thrust forces to the main aerial vehicle 210 and any payload engaged thereby, to aerially transport the engaged payload thereby. In some embodiments, one or more of the propulsion motors 222 may be a brushless DC multi-phase motor such as an outrunner brushless motor or an inrunner brushless motor.

The main aerial vehicle 210 may include any number of such propulsion motors 222 of any kind. For example, one or more of the propulsion motors 222 may be aligned or configured to provide forces of lift to the main aerial vehicle 210, exclusively, while one or more of the propulsion motors 222 may be aligned or configured to provide forces of thrust to the main aerial vehicle 210, exclusively. Alternatively, one or more of the propulsion motors 222 may be aligned or configured to provide forces of lift and forces of thrust to the main aerial vehicle 210, as needed. For example, the propulsion motors 222 may be fixed in their orientation on the main aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The altimeter 224 may be any device, component, system, or instrument for determining an altitude of the main aerial vehicle 210, and may include any number of transmitters, receivers, range finders (e.g., laser or radar), imaging devices or other features for determining altitudes above ground. The position sensor 226 may be any device, component, system or instrument adapted to receive signals (e.g., trilateration data or information) relating to a position of the main aerial vehicle 210, from one or more GPS satellites of a GPS network, from one or more towers or beacons from a cellular telephone network, or from any other source (not shown). In some embodiments, the position sensor 226, or position data received thereby, may be used to determine an airspeed of the main aerial vehicle 210 over time.

The motion sensor 228 may be any component that is configured to determine attributes of motion of the main aerial vehicle 210 along or about one or more axes in three-dimensional space. For example, the motion sensor 228 may include an accelerometer or another device that is adapted to detect or measure accelerations of the main aerial vehicle 210 in one or more translational or rotational dimensions or directions. The motion sensor 228 may also include a gyroscope that is adapted to determine an angular orientation or velocity of the main aerial vehicle 210 based on principles of angular momentum. The motion sensor 228 may also include a compass that is adapted to determine one or more directions with respect to a frame of reference that is fixed with respect to the surface of the Earth (e.g., a pole thereof). Additionally, the main aerial vehicle 210 may further include any other sensors or components for determining positions, velocities, accelerations or orientations of the main aerial vehicle 210. Alternatively, the motion sensor 228 may be the same component as the position sensor 226, or may operate in conjunction with the position sensor 226.

In some embodiments, raw information or data obtained from the motion sensor 228 may be fused or otherwise aggregated into a common set and filtered or processed in order to remove any variations or fluctuations expressed therein, and to identify net accelerations, velocities or orientations of the main aerial vehicle 210 based on such raw information or data, e.g., according to one or more sensor fusion algorithms or techniques. For example, the raw information or data may reflect localized variations in acceleration, velocity or position due to erratic or temporary eccentricities of the motion of the main aerial vehicle 210, or noise or drift that may be associated with an accelerometer, a gyroscope, a compass or another aspect of the motion sensor 228 over time. Additionally, the raw information or data may be subject to the effects of gravity. Raw information or data collectively obtained from all available sensors may be processed according to one or more high-pass or low-pass filters or any other processes or techniques in order to determine true, net accelerations, velocities or orientations of the main aerial vehicle 210 over time.

The airspeed sensor 230 may be one or more of any type or form of anemometer or other system for determining a speed of air flow within a vicinity of the main aerial vehicle 210. The airspeed sensor 230 may include one or more pitot tubes, ultrasonic transceivers (e.g., transmitters and/or receivers) or the like, and may operate independently or in conjunction with one another. Alternatively, the airspeed sensor 230 may include one or more other devices, components, systems, or instruments for determining a speed or velocity of the main aerial vehicle 210, and may operate in conjunction with one or more of the position sensor 226, the motion sensor 228, or any other system. The barometer 232 may be any system for determining a level of atmospheric pressure (e.g., relative or absolute) within a vicinity of the main aerial vehicle 210.

The imaging device 234 may be any form of optical recording devices that may be aligned with respect to any expected or ordinary operating orientation of the main aerial vehicle 210, and are configured to photograph or otherwise record imaging data of objects or any other elements within fields of view forward of, aft of, lateral to, above or below the main aerial vehicle 210, or for any other purpose. The imaging device 234 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 234 may capture imaging data in the form of one or more still or moving images of any kind or form, as well as any relevant audio signals or other information during the operation of the main aerial vehicle 210.

The imaging device 234 may be mounted, fixed, embedded or otherwise joined to one or more external surfaces of the main aerial vehicle 210 in any manner and in any orientation or alignment to capture imaging data from above the main aerial vehicle 210. For example, the imaging device 234 may be coupled to any form of support system or structure for maintaining the lenses or other optical elements of the imaging device 234 at a selected orientation or configuration. Alternatively, the imaging device 234 may be mounted, fixed, embedded or otherwise joined to external surfaces of the main aerial vehicle 210 in any other manner.

The imaging device 234 may communicate with the processor 212 and/or the control system 220, or with one another, by way of a wired or wireless connection that may be dedicated or comprise all or part of an internal network (not shown), e.g., an internal communications bus. Additionally, the imaging device 234 may be adapted or otherwise configured to communicate with the data processing system 280 by way of the network 290. The imaging device 234 may be of any type or form in accordance with the present disclosure, including but not limited to one or more digital cameras, depth sensors or range cameras, infrared cameras, radiographic cameras or other optical sensors.

In addition to the imaging device 234, the main aerial vehicle 210 may also include any number of other sensors, components or other features for controlling or aiding in the operation of the main aerial vehicle 210, including but not limited to one or more environmental or operational sensors for determining one or more attributes of an environment in which the main aerial vehicle 210 is operating, or may be expected to operate, including extrinsic information or data or intrinsic information or data. For example, the main aerial vehicle 210 may include one or more compasses, speedometers, thermometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

As is shown in FIG. 2A, the system 200 includes the plurality of auxiliary aerial vehicles 250-1, 250-2 . . . 250-*n*. As is shown in FIG. 2B, a representative one of the auxiliary aerial vehicles 250-*i* is shown. The auxiliary aerial vehicle 250-*i* includes a processor 252-*i*, a memory 254-*i* and a transceiver 256-*i*. The auxiliary aerial vehicle 250-*i* further includes a control system 260-*i*, a plurality of propulsion motors 262-*i*, an altimeter 264-*i*, a position sensor 266-*i* and a motion sensor 268-*i*. The auxiliary aerial vehicle 250-*i* also includes an airspeed sensor 270-*i*, a barometer 272-*i* and an imaging device 274-*i*. Each of the processor 252-*i*, the memory 254-*i*, the transceiver 216-*i*, the control system 260-*i*, the plurality of propulsion motors 262-*i*, the altimeter 264-*i*, the position sensor 266-*i*, the motion sensor 268-*i*, the airspeed sensor 270-*i*, the barometer 272-*i* and the imaging device 274-*i* may have one or more of the same features, attributes or characteristics of the processor 212, the memory 214, the transceiver 216, the control system 220, the plurality of propulsion motors 222, the altimeter 224, the position sensor 226, the motion sensor 228, the airspeed sensor 230, the barometer 232 or the imaging device 234 of the main aerial vehicle 210, as described above, or one or more other features, attributes or characteristics in accordance with the present disclosure. For example, each of the processor 252-*i*, the memory 254-*i*, the transceiver 216-*i*, the control system 260-*i*, the plurality of propulsion motors 262-*i*, the altimeter 264-*i*, the position sensor 266-*i*, the motion sensor 268-*i*, the airspeed sensor 270-*i*, the barometer 272-*i* and the imaging device 274-*i* may execute any of the actions or perform any of the functions by or on behalf of auxiliary aerial vehicle 250-*i* that are described herein with respect to the processor 212, the memory 214, the transceiver 216, the control system 220, the plurality of propulsion motors 222, the altimeter 224, the position sensor 226, the motion sensor 228, the airspeed sensor 230, the barometer 232 or the imaging device 234 and the main aerial vehicle 210.

In particular, raw information or data obtained from the motion sensors 268-*i* of any of the auxiliary aerial vehicles 250-*i* may be fused or otherwise aggregated into a common set and filtered or processed in order to remove any variations or fluctuations expressed therein, and to identify net accelerations, velocities or orientations of the auxiliary aerial vehicles 250-*i* based on such raw information or data, e.g., according to one or more sensor fusion algorithms or techniques. For example, the raw information or data may reflect localized variations in acceleration, velocity or position due to erratic or temporary eccentricities of the motion of the auxiliary aerial vehicles 250-*i*, or noise or drift that may be associated with an accelerometer, a gyroscope, a compass or another aspect of the motion sensors 268-*i* over time. Additionally, the raw information or data may be subject to the effects of gravity. Raw information or data collectively obtained from all available sensors of any of the auxiliary aerial vehicles 250-*i* may be processed according to one or more high-pass or low-pass filters or any other processes or techniques in order to determine true, net accelerations, velocities or orientations of the auxiliary aerial vehicles 250-*i* over time.

Moreover, raw information or data captured using one or more sensors aboard the main aerial vehicle 210, and raw information or data captured using one or more sensors aboard one or more of the auxiliary aerial vehicles 250-1, 250-2 . . . 250-*n*, may be fused or otherwise aggregated in order to generate a model of aerodynamic performance (e.g., an aerodynamic model) of the main aerial vehicle 210 based on the behavior of the main aerial vehicle 210 within the presence of flow as modeled by the auxiliary aerial vehicles 250-1, 250-2 . . . 250-*n* with respect to the main aerial vehicle 210. Where the positions, velocities and orientations of the main aerial vehicle 210 and the auxiliary aerial vehicles 250-1, 250-2 . . . 250-*n* over time are known, a three-dimensional model of the flow conditions within a vicinity of the main aerial vehicle 210, and a state of the main aerial vehicle 210 within the presence of the flow conditions may be estimated, or an aerodynamic model of the main aerial vehicle 210 may be generated, using one or more algorithms or techniques.

Although the block diagrams of FIGS. 2A and 2B include a single box for a propulsion motor 222, 262-*i*, a single box for an altimeter 224, 264-*i*, a single box for a position sensor 226, 266-*i*, a single box for a motion sensor 228, 268-*i*, a single box for an airspeed sensor 230, 270-*i*, a single box for a barometer 232, 272-*i* and a single box for an imaging device 234, 274-*i*, those of ordinary skill in the pertinent arts will recognize that any number or type of propulsion motors, altimeters, position sensors and/or imaging devices may be provided aboard the main aerial vehicle 210 or any of the auxiliary aerial vehicles 250-1, 250-2 . . . 250-*n* in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIGS. 2A and 2B may be independently provided for the exclusive purpose of receiving, analyzing or storing information or data captured by one or more sensors aboard the main aerial vehicle 210 or any of the auxiliary aerial vehicles 250-1, 250-2 . . . 250-*n*, or, alternatively, provided in connection with one or more physical or virtual services that are configured to receive, analyze or store such information or data, or other information or data, as well as one or more other functions. The servers 282 may be connected to or otherwise communicate with the processors 284 and the data stores 286, which may store any type of information or data, including but not limited to information or data regarding positions or times of changes in altitude, maps or other cartographic representations of locations of surplus or deficit energy, for any purpose. The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data in one or more data stores, e.g., from the main aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the main aerial vehicle 210.

Moreover, in some embodiments, functions described herein as being performed by the data processing system 280 and/or the server 282 may be performed by one or more processors or other systems provided aboard the main aerial vehicle 210 and/or one or more of the auxiliary aerial vehicles 250-1, 250-2 ... 250-n, each of which may be configured to transmit and receive information or data therebetween, e.g., by the transceiver 216 and/or the transceiver 256-i.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, which may be operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the processor 252-i, the servers 282 and/or the processors 284 may be configured to execute one or more calculations regarding operations of the main aerial vehicle 210 or one or more of the auxiliary aerial vehicles 250-1, 250-2 ... 250-n. In some embodiments, the processor 212, the processor 252-i, the servers 282 and/or the processors 284 may be configured to generate one or more models of air flow passing above, below, forward of, aft of or alongside the main aerial vehicle 210 or one or more of the auxiliary aerial vehicles 250-1, 250-2 ... 250-n. In some embodiments, the processor 212, the processor 252-i, the servers 282 and/or the processors 284 may be configured to determine an optimal path or route between two locations for the execution of one or more testing evolutions or other tasks by the main aerial vehicle 210 or the auxiliary aerial vehicles 250-1, 250-2 ... 250-n based on any factor or element, including but not limited to times required to travel on any paths of an optimal route, any costs associated with traveling on the paths, or any other intrinsic or extrinsic factors, such as according to one or more traditional shortest path or shortest route algorithms such as Dijkstra's Algorithm, Bellman-Ford Algorithm, Floyd-Warshall Algorithm, Johnson's Algorithm or a hub labeling technique.

In some embodiments, the processor 212, the processor 252-i and/or the server 282 may be configured to execute one or more machine learning systems or techniques. For example, in some embodiments, an artificial neural network or other machine learning system or technique may be trained to model flow conditions in three-dimensional space based on airspeeds or directions of flow determined at discrete points, e.g., selected positions of the main aerial vehicle 210 and/or the auxiliary aerial vehicles 250-1, 250-2 ... 250-n. An artificial neural network or other machine learning system may be trained in a supervised or unsupervised manner, and may include any number of neurons in any number of layers, including an input layer, an output layer, and one or more intervening hidden layers. Each of the neurons in a layer within a neural network may receive an input and generate an output in accordance with an activation or energy function, with parameters corresponding to the various strengths or synaptic weights, e.g., in the form of a sigmoid function, wherein an output thereof may have a range of zero to one or 0 to 1, a hyperbolic tangent function, wherein an output thereof may have a range of negative one to positive one, or −1 to +1, or any others. A machine learning system, such as an artificial neural network, may be further trained using any information, data or metadata, regarding flows of air.

The main aerial vehicle 210, the auxiliary aerial vehicles 250-1, 250-2 ... 250-n and/or the data processing system 280 may use any web-enabled or Internet applications or features, or any other client-server applications or features including E-mail or other messaging techniques, to connect to the network 290, or to communicate with one another. For example, the main aerial vehicle 210 and/or the auxiliary aerial vehicles 250-1, 250-2 ... 250-n may be adapted to transmit or receive information or data in the form of synchronous or asynchronous messages to or from one another directly, to or from the data processing system 280 via the network 290, or to or from any other computer device (e.g., to one or more other aerial vehicles) in real time or in near-real time, or in one or more offline processes, via the network 290. Those of ordinary skill in the pertinent art would recognize that the main aerial vehicle 210, the auxiliary aerial vehicles 250-1, 250-2 ... 250-n or the data processing system 280 may operate or be operated by any of a number of computing devices that are capable of communicating over the network, including but not limited to set-top boxes, mobile devices, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212, the processor 2524, the servers 282 and/or the processors 284, or any other computers or control systems utilized by the main aerial vehicle 210 or the data processing system 280 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
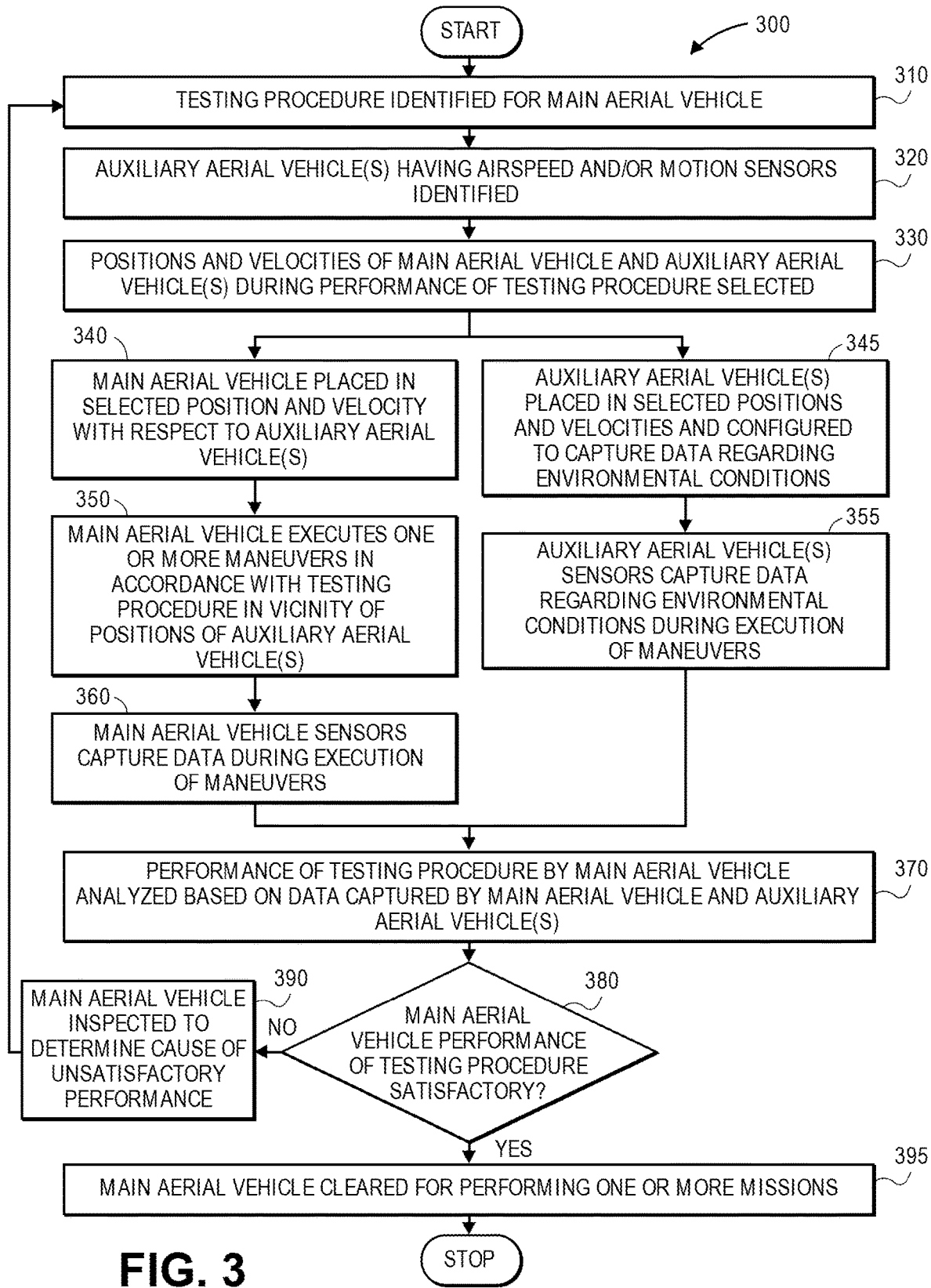
FIG. 3 is a flow chart of one process for using auxiliary aerial vehicles for flow characterization in accordance with embodiments of the present disclosure.

As is discussed above, one or more of the systems and methods disclosed herein may be utilized to determine whether operations, such as one or more testing evolutions, have been satisfactorily completed by an aerial vehicle based on information or data captured using one or more auxiliary aerial vehicles within a vicinity of the aerial vehicle. Referring to FIG. 3, a flow chart 300 of one process for using auxiliary aerial vehicles for flow characterization in accordance with embodiments of the present disclosure is shown. At box 310, a testing procedure is identified for a main aerial vehicle. For example, the testing procedure may be one of a plurality of procedures (e.g., a library of procedures) with one or more discrete steps or evolutions to be performed by the main aerial vehicle. Information or data regarding the testing procedure, or regarding the plurality of testing procedures, may be hard-coded into one or more memory components aboard the main aerial vehicle, transmitted to the main aerial vehicle over one or more networks, or provided to the main aerial vehicle in any other manner.

In some embodiments, the testing procedure may require the main aerial vehicle to travel at a selected altitude, at a selected airspeed, or in a selected direction (e.g., on a selected course) by the main aerial vehicle. In some embodiments, the testing procedure may further require the main aerial vehicle to execute one or more maneuvers by the main aerial vehicle. In some embodiments, the testing procedure may require the main aerial vehicle to operate one or more propulsion motors at selected speeds, to operate one or more control surfaces (e.g., wings, rudders, ailerons, elevators, flaps, brakes, slats or other features) or to extend or retract one or more appurtenances or other features (e.g., engagement systems).

At box 320, one or more auxiliary aerial vehicle(s) that are outfitted with airspeed sensors, motion sensors or other sensors are identified, and at box 330, positions and velocities of the main aerial vehicle and the auxiliary aerial vehicle(s) during the performance of the testing procedure are selected. For example, where the testing procedure requires the main aerial vehicle to operate at a selected altitude, at a selected airspeed, or on a selected course, positions, velocities and/or altitudes for more auxiliary aerial vehicles during one or more intervals or periods of time associated with the testing procedure may be selected with respect to the selected altitude, the selected airspeed or the selected course of the main aerial vehicle in order to optimize the capture of information or data regarding flow conditions above, below, forward of, aft of or alongside the main aerial vehicle during the testing procedure. The positions and/or velocities of the main aerial vehicle and the auxiliary aerial vehicle(s) may be selected based on any attributes or factors, including one or more attributes or factors pertaining to the testing procedure, as well as any environmental or operational restrictions or constraints. For example, information or data regarding the testing procedure may be hard-coded into one or more memory components aboard one or more of the auxiliary aerial vehicles, transmitted to the auxiliary aerial vehicles over one or more networks, or provided to the auxiliary aerial vehicles in any other manner. In some embodiments, each of the main aerial vehicle and the one or more auxiliary aerial vehicles may be provided with a set of common instructions for operating in one or more positions, velocities and/or altitudes for during the performance of the testing procedure by the main aerial vehicle.

At box 340, a main aerial vehicle is placed in the selected position and the selected velocity with respect to the auxiliary aerial vehicle(s). In parallel, at box 345, the auxiliary aerial vehicle(s) are placed in the selected positions and velocities, and configured to capture data regarding environmental conditions (e.g., airspeeds) at such positions and velocities. For example, the auxiliary aerial vehicle(s) may be programmed to travel to the selected positions and operate at selected airspeeds or on selected courses. In some embodiments, the auxiliary aerial vehicles may be programmed to hover, e.g., to operate at constant altitudes and with zero velocities, at the selected positions. At box 350, the main aerial vehicle executes one or more maneuvers in accordance with the testing procedure in the vicinity of the positions of the auxiliary aerial vehicles. In parallel, at box 355, the auxiliary aerial vehicle(s) capture data regarding environmental conditions during the execution of the maneuvers. For example, in some embodiments, the testing procedure requires changing a position or an orientation of the aerial vehicle about one or more axes, e.g., along or about a roll axis (or x-axis), a pitch axis (or y-axis) or a yaw axis (or z-axis). In some embodiments, the testing procedure may require operating one or more propulsion motors at selected speeds, operating one or more control surfaces within finite ranges, or extending or retracting one or more appurtenances. During intervals or periods of time at which the main aerial vehicle performs the evolutions, one or more auxiliary aerial vehicles capture and record information or data regarding their positions and orientations, as well as information or data regarding air flow conditions at such positions.

At box 360, the main aerial vehicle's sensors capture data during the execution of the maneuvers. The captured data may relate to any aspect of the main aerial vehicle's operations, including but not limited to altitudes, airspeed or courses of the main aerial vehicle, or orientations of the main aerial vehicle about one or more axes, at discrete times associated with the maneuvers. The captured data may further relate to the operation of one or more discrete components of the main aerial vehicle, e.g., speeds of propulsion motors, positions or angles of control surfaces, distances or angles of orientation of one or more appurtenances, or the like. In some embodiments, the captured data need not relate to the execution of a maneuver. For example, the captured data may include a list or set of actions or events undertaken by one or more control systems, in order to ensure that such control systems, or propulsion motors or control surfaces under control of such control systems, are properly functioning. For example, the testing procedure may require determining or tracking signals generated by an inertial navigation system of the main aerial vehicle in response to sensed changes in position or orientation along or about one or more of the main aerial vehicle's principal axes, or determining or tracking one or more control signals for causing motors and/or control surfaces to act in response to signals generated by the inertial navigation system, in order to ensure that the main aerial remains at a desired altitude, course or angular orientation, or in order to effectuate a desired change in altitude, course or angular orientation.

At box 370, the performance of the testing procedure by the main aerial vehicle is analyzed with respect to the data captured by the main aerial vehicle and the one or more auxiliary aerial vehicles. For example, the data captured by the main aerial vehicle and the one or more auxiliary aerial vehicles may be used to generate a model of flow above, below, forward of, aft of or alongside the main aerial vehicle over intervals or periods of time during which the maneuvers were performed. The model of flow may be used in concert with data regarding the execution of the maneuvers captured by the main aerial vehicle to estimate states of the main aerial vehicle in the presence of the flow conditions during the testing procedure, or to generate an aerodynamic model of the main aerial vehicle from one or more of such states, e.g., a model of airspeeds, angles of attack, angles of sideslip, or forces or moments affecting the main aerial vehicle, or for any other purpose in connection with evaluating the performance of the main aerial vehicle during such operations. Such an analysis may be conducted in real time, in near-real time, or at any time, by one or more ground-based, "cloud"-based or airborne computer devices or systems. For example, in some embodiments, the performance of the main aerial vehicle may be compared to a previously generated aerodynamic model of the main aerial vehicle, or another aerial vehicle of the same class, size, shape or type as the main aerial vehicle.

For example, in some embodiments, some or all of the data captured by sensors aboard the main aerial vehicle at box 360, or by sensors aboard the auxiliary aerial vehicle(s) at box 355 may be subjected to one or more regression analyses, e.g., to filter or remove noise or other irrelevant data therefrom before being processed to estimate speeds and directions of air flows at discrete points in space where the auxiliary aerial vehicles were located to construct one or more models or profiles of the flow. In some embodiments, some or all of the data captured by sensors aboard the main aerial vehicle at box 360, or by sensors aboard the auxiliary aerial vehicle(s) at box 355 may be provided to a machine learning system or algorithm, e.g., an artificial neural network, that is trained to calculate forces or moments acting upon the main aerial vehicle and to determine the testing procedure was satisfactorily completed. Any other system or technique for evaluating data captured by the main aerial vehicle or one or more of the auxiliary aerial vehicles may be utilized in accordance with the present disclosure.

At box 380, whether the performance of the testing procedure by the main aerial vehicle was satisfactory is determined. For example, in some embodiments, where a testing procedure has a number of associated qualitative or quantitative thresholds or requirements, whether such thresholds or requirements have been met may be determined. In some embodiments, one or more processors or systems aboard the main aerial vehicle may determine whether the testing procedure was satisfactorily performed. In some embodiments, however, whether the testing procedure was satisfactorily performed may be determined according to any other standard by one or more processors or systems in another location, e.g., in a ground-based physical location, or in one or more alternate or virtual locations, such as a "cloud"-based environment. In some embodiments, whether the testing procedure was satisfactorily performed may be determined by one or more processors or systems aboard one or more of the auxiliary aerial vehicles.

If the performance of the testing procedure was not satisfactory, then the process advances to box 390, where the main aerial vehicle is inspected to determine a cause of the unsatisfactory performance. For example, the main aerial vehicle may be grounded and otherwise evaluated to determine one or more causes for the unsatisfactory performance by a manual or visual inspection of one or more aspects of the main aerial vehicle, by a review or evaluation of the data captured by the main aerial vehicle or one or more of the auxiliary aerial vehicles during the testing procedure, or in any other manner. The process then returns to box 310, where a testing procedure is identified for the main aerial vehicle. If the performance of the testing procedure was satisfactory, however, then the process advances to box 395, where the main aerial vehicle is cleared for performing one or more missions, and the process ends. Information or data regarding the performance of the testing procedure by the main aerial vehicle may be stored in one or more data stores and utilized for any purpose.

Figure 4:
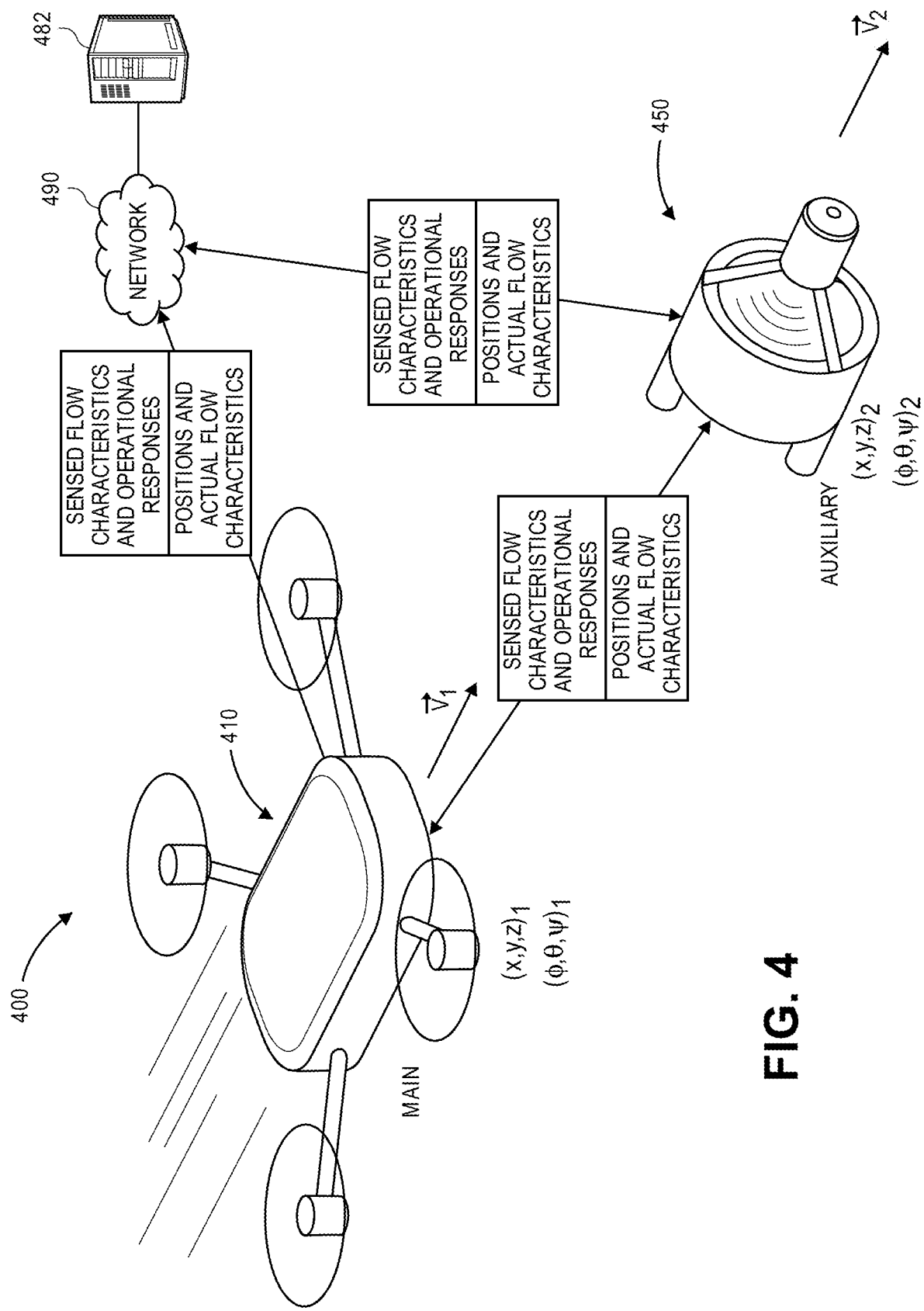
FIG. 4 is a view of aspects of one system for using auxiliary aerial vehicles for flow characterization in accordance with embodiments of the present disclosure.

In accordance with some embodiments of the present disclosure, a main (or primary) aerial vehicle and one or more auxiliary (or secondary) aerial vehicles may capture information or data regarding the performance of one or more testing evolutions, or environmental conditions during the performance of such testing evolutions, and provide such information or data to one or more processing systems for analysis. Alternatively, the main aerial vehicle and the one or more auxiliary aerial vehicles may exchange such information or data between one another, and the information or data may be processed using one or more computer systems or devices provided aboard the main aerial vehicle or one or more of the auxiliary aerial vehicles. Referring to FIG. 4, a view of aspects of one system for using auxiliary aerial vehicles for flow characterization in accordance with embodiments of the present disclosure is shown. Except where otherwise noted, reference numerals preceded by the number "4" shown in FIG. 4 indicate components or features that are similar to components or features having reference numerals preceded by the number "2" shown in FIGS. 2A and 2B or by the number "1" shown in FIGS. 1A through 1E.

As is shown in FIG. 4, the system 400 includes a main aerial vehicle 410 and an auxiliary aerial vehicle 450 that are connected to one another and also to a server 482 over a network 490, which may include the Internet in whole or in part. During operations, the main aerial vehicle 410 may be programmed to travel to a position $(x, y, z)_1$ in three-dimensional space, and to proceed at a velocity (e.g., an airspeed and direction) $V_0$. The auxiliary aerial vehicle 450 may be further programmed to travel to a position $(x, y, z)_2$ in three-dimensional space, and to proceed at a velocity $V_1$. Each of the main aerial vehicle 410 and the auxiliary aerial vehicle 450 may be configured to capture information or data during intervals or periods of time within which one or more testing evolutions or other operations are performed by the main aerial vehicle 410. For example, as is shown in FIG. 4, one or more inertial navigation systems and/or control systems aboard the main aerial vehicle 410 may be programmed to capture information or data regarding sensed positions or orientations of the main aerial vehicle 410, e.g., along or about one or more principal axes, and to generate one or more control signals in response to such positions or orientations. The auxiliary aerial vehicle 450 may be further configured to capture information or data regarding flow characteristics above, below, forward of, aft of or alongside the main aerial vehicle 410, and such flows may be modeled based on the information or data captured by the auxiliary aerial vehicle 450. The information or data captured by the main aerial vehicle 410 and the auxiliary aerial vehicle 450 may be processed by the server 482 to determine a state of the main aerial vehicle 410 in the presence of the modeled flow, or to evaluate the performance of the one or more testing evolutions or other operations by the main aerial vehicle 410. Alternatively, the information or data captured by the main aerial vehicle 410 and the auxiliary aerial vehicle 450 may be shared directly therebetween, and processed by one or computer processors or systems operating aboard the main aerial vehicle 410 or the auxiliary aerial vehicle 450.

Thus, in some embodiments, an auxiliary aerial vehicle, such as the auxiliary aerial vehicle 410 shown in FIG. 4, may be used to capture information or data for modeling conditions or characteristics of flows imparted on another aerial vehicle, such as the main aerial vehicle 410 of FIG. 4. The modeled flow conditions or characteristics may be used to calibrate the inertial navigation systems and/or control systems of the other aerial vehicle, e.g., the main aerial vehicle 410, and to ensure that the other aerial vehicle is properly programmed and configured to respond to environmental conditions (e.g., gusts of wind or other air flows) during flight operations. Alternatively, an auxiliary aerial vehicle may be used to capture information or data regarding flows of air such as airspeeds, angles of attack, angles of sideslip, or forces or moments imparted thereby during any other type or form of evolutions (e.g., any other type or form of testing evolutions). For example, the modeled flow conditions or characteristics may be used in concert with data regarding operations of the main aerial vehicle 410 to estimate states of the main aerial vehicle 410 in the presence of the flow, or to generate an aerodynamic model of the main aerial vehicle 410 from one or more of such states. Such an analysis may be conducted in real time, in near-real time, or at any time, by one or more ground-based, "cloud"-based or airborne computer devices or systems. An aerodynamic model of the main aerial vehicle 410 may be compared to a previously generated aerodynamic model of the main aerial vehicle 410 in order to determine whether the main aerial vehicle 410 is satisfactorily performing within the presence of the flow, or whether testing, maintenance or inspection of the main aerial vehicle 410 are required.

Although the system 400 of FIG. 4 includes just a single auxiliary aerial vehicle 450, those of ordinary skill in the pertinent arts will recognize that any number of auxiliary aerial vehicles may be programmed to travel to selected positions and to proceed at selected velocities while capturing information or data regarding operations of another aerial vehicle. Likewise, although the system 400 of FIG. 4 includes just a single main aerial vehicle 410, those of ordinary skill in the pertinent arts will recognize that any number of main aerial vehicles may be programmed to travel to selected positions and to proceed at selected velocities, while information or data regarding the operation of the main aerial vehicles is captured by one or more auxiliary aerial vehicles.

Figure 5:
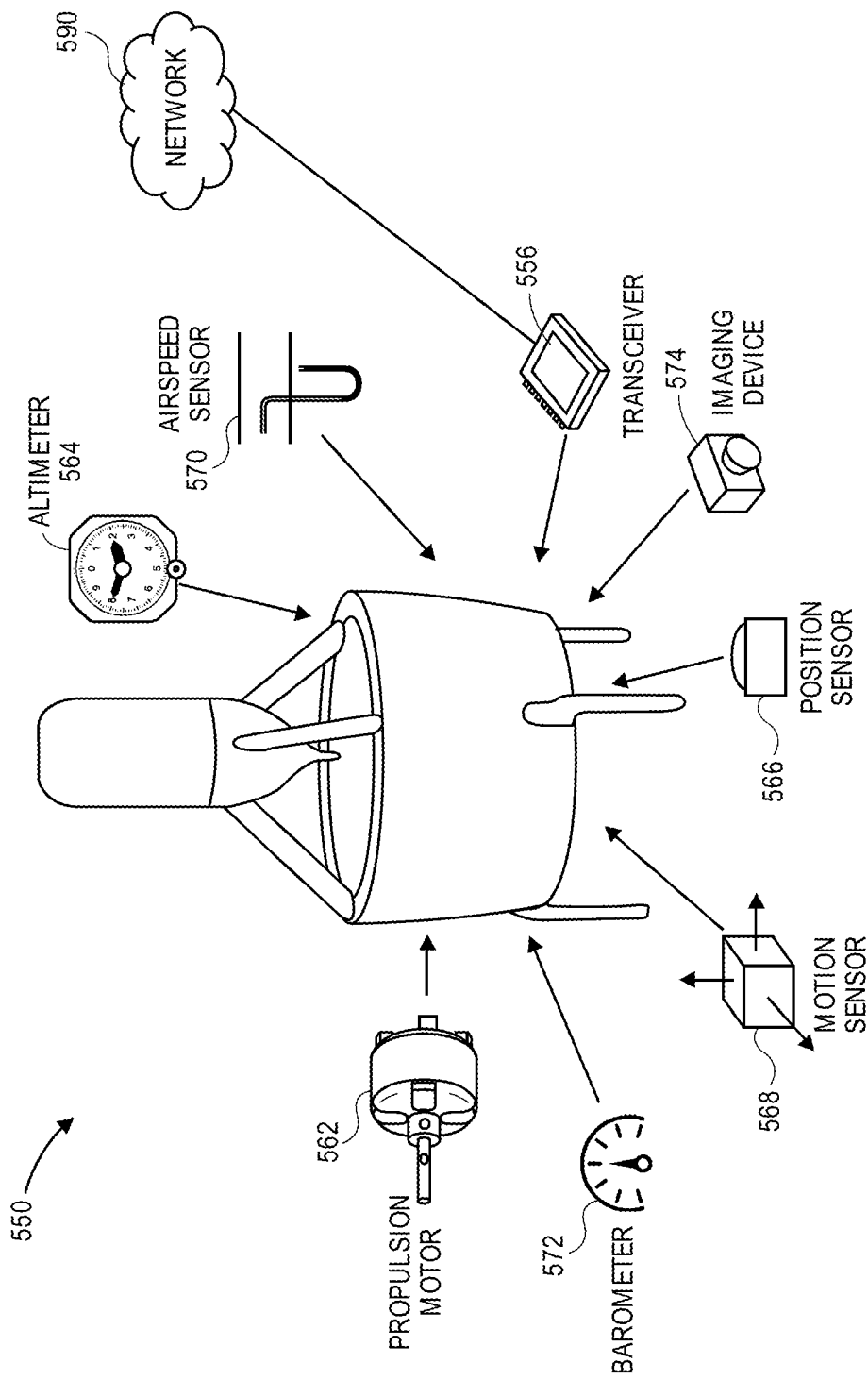
FIG. 5 is a view of aspects of one system for using auxiliary aerial vehicles for flow characterization in accordance with embodiments of the present disclosure.

In accordance with some embodiments of the present disclosure, an auxiliary aerial vehicle may include any number of sensors for capturing information or data regarding one or more environmental conditions during the performance of testing evolutions by another aerial vehicle, e.g., a main (or primary) aerial vehicle. Referring to FIG. 5, a view of aspects of one system for using auxiliary aerial vehicles for flow characterization in accordance with embodiments of the present disclosure is shown. Except where otherwise noted, reference numerals preceded by the number "5" shown in FIG. 5 indicate components or features that are similar to components or features having reference numerals preceded by the number "4" shown in FIG. 4, by the number "2" shown in FIGS. 2A and 2B or by the number "1" shown in FIGS. 1A through 1E.

As is shown in FIG. 5, an auxiliary aerial vehicle 550 is in the form of a ducted fan. The auxiliary aerial vehicle 550 shown in FIG. 5 includes a propulsion motor 562, an altimeter 564, a position sensor 566, a motion sensor 568, a pair of airspeed sensors 570, one or more barometers 572 and an imaging device 574.

The auxiliary aerial vehicle 550 further includes a transceiver 556 that is configured to communicate wirelessly or via one or more wired connections with the propulsion motor 562, the altimeter 564, the position sensor 566, the motion sensor 568, the airspeed sensors 570, the barometers 572 or the imaging device 574, or other devices or systems aboard the auxiliary aerial vehicle 550. The transceiver 556 is further configured to communicate wirelessly or via one or more wired connections with one or more external devices or systems, e.g., a main aerial vehicle, one or more other auxiliary aerial vehicles, or an external data processing system, over a network 590.

The propulsion motor 562 may be any type or form of motor (e.g., electric, gasoline-powered or any other type of motor) capable of generating sufficient rotational speeds of one or more propellers or other components to provide lift and/or thrust forces to the auxiliary aerial vehicle 550 and any payload engaged thereby, to aerially transport the engaged payload thereby. In some embodiments, one or more of the propulsion motor 562 may be a brushless DC multi-phase motor such as an outrunner brushless motor or an inrunner brushless motor. Although the auxiliary aerial vehicle 550 of FIG. 5 is shown in the form of a ducted fan having a single propulsion motor 562, those of ordinary skill in the pertinent arts will recognize that an auxiliary aerial vehicle may take any form, and may include any number of propulsion motors, or may be configured for hovering or flight operations without a propulsion motor (e.g., a glider or lighter-than-air craft, such as a dirigible).

The altimeter 564 may be any device, component, system, or instrument for determining an altitude of the auxiliary aerial vehicle 550, and may include any number of transmitters, receivers, range finders (e.g., laser or radar), imaging devices or other features for determining altitudes above ground. The position sensor 566 may be a GPS sensor or receiver, or any other system for determining a position of the auxiliary aerial vehicle 550, e.g., a cellular telephone transceiver, based on one or more signals received from an external source. Alternatively, the position sensor 566 may include one or more inertial systems for determining a position of the auxiliary aerial vehicle 550.

The motion sensor 568 may be any device or system for determining accelerations, velocities or orientations of the auxiliary aerial vehicle 550 in one or more directions in three-dimensional space, viz., along or about x-, y- or z-directions or axes, and may include one or more accelerometers, gyroscopes, compasses or other systems. The airspeed sensors 570 may be any device or system for determining a speed or velocity of air flowing over or around the auxiliary aerial vehicle 550, e.g., one or more pitot tubes, ultrasonic transmitters and/or receivers or the like. The barometers 572 may be any device or system for determining an atmospheric pressure within a vicinity of the auxiliary aerial vehicle 550. The imaging devices 574 may be any form of optical recording devices that are configured to capture imaging data of objects or any other elements within fields of view forward of, aft of, lateral to, above or below the auxiliary aerial vehicle 550, or for any other purpose, and may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 574 may capture imaging data in the form of one or more still or moving images of any kind or form, as well as any relevant audio signals or other information during the operation of the auxiliary aerial vehicle 550.

Figure 6A:
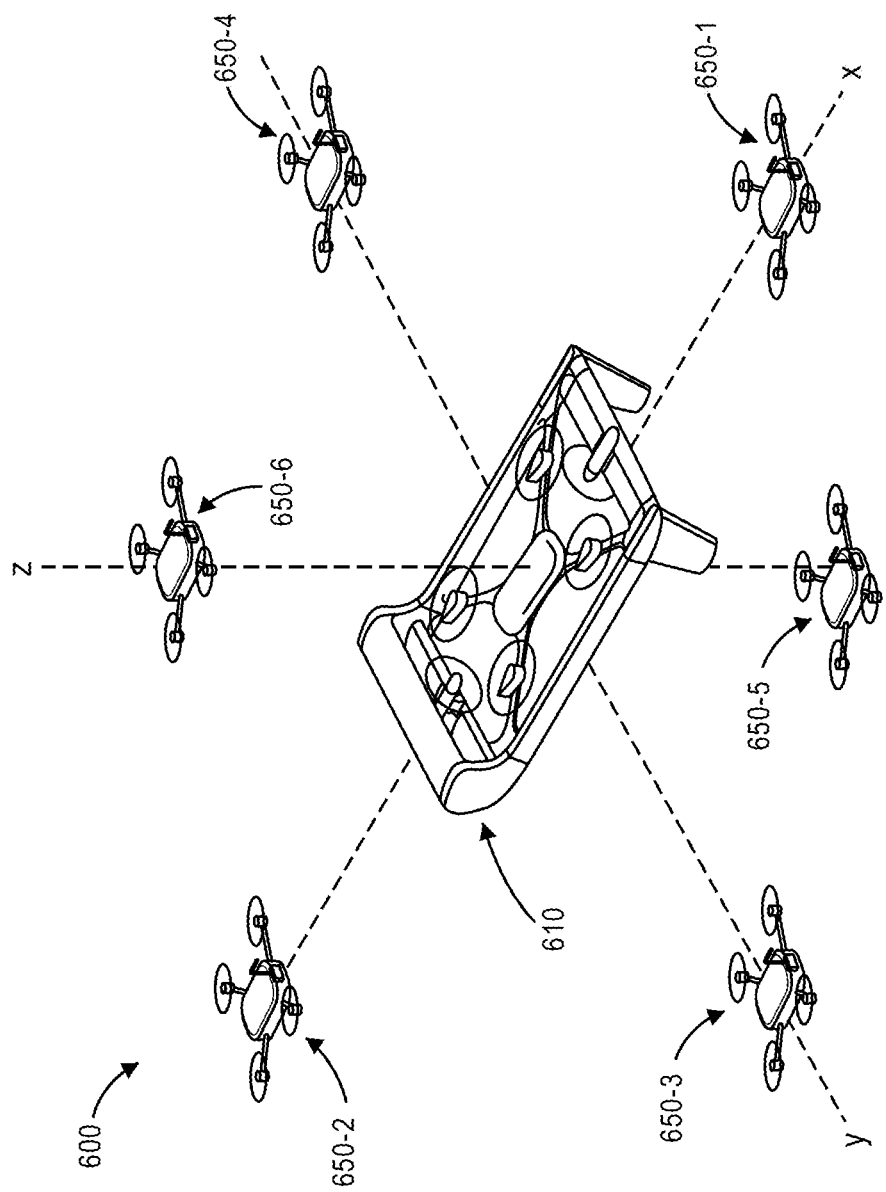
FIGS. 6A and 6B are views of aspects of one system for using auxiliary aerial vehicles for flow characterization in accordance with embodiments of the present disclosure.
Figure 6B:
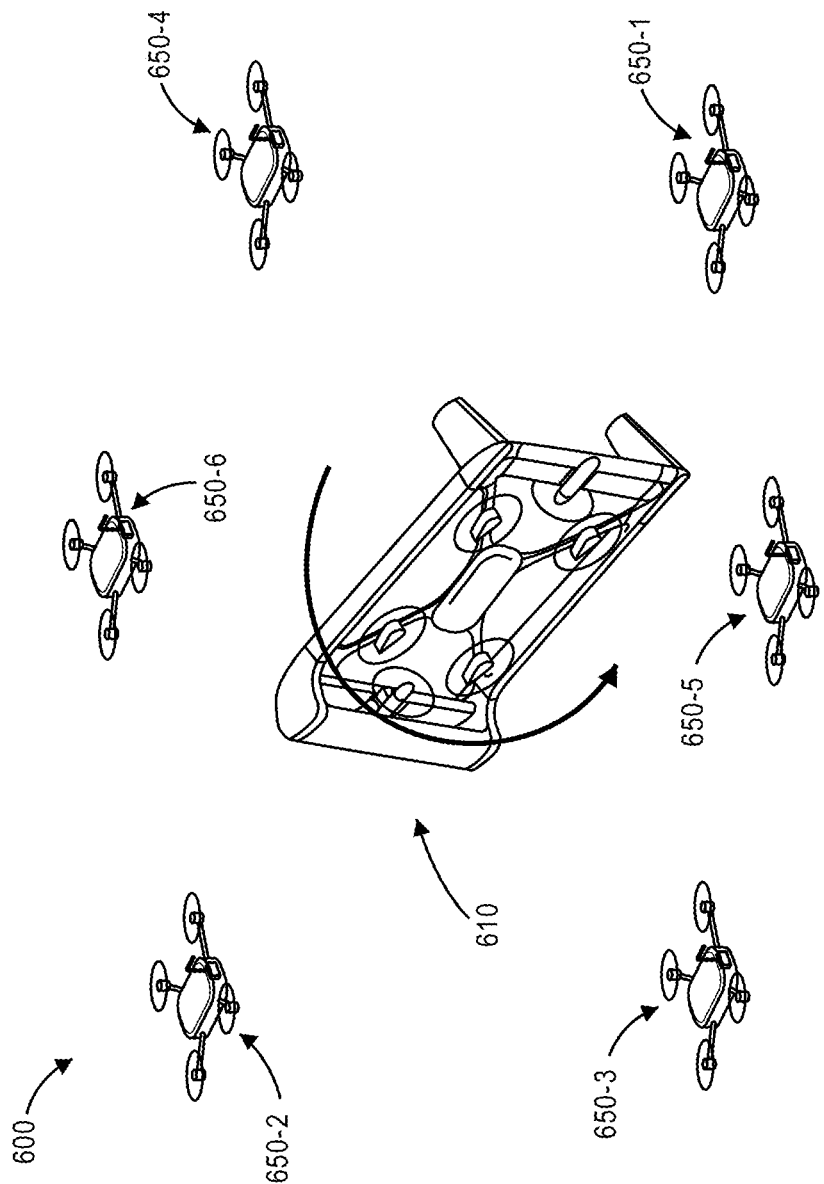

In accordance with some embodiments of the present disclosure, one or more auxiliary aerial vehicles may be placed in any absolute or relative position with respect to another aerial vehicle (e.g., a main aerial vehicle) in order to capture information or data regarding one or more environmental conditions during the performance of testing evolutions by the other aerial vehicle. Referring to FIGS. 6A and 6B, views of aspects of one system for using auxiliary aerial vehicles for flow characterization in accordance with embodiments of the present disclosure are shown. Except where otherwise noted, reference numerals preceded by the number "6" shown in FIG. 6A or 6B indicate components or features that are similar to components or features having reference numerals preceded by the number "5" shown in FIG. 5, by the number "4" shown in FIG. 4, by the number "2" shown in FIGS. 2A and 2B or by the number "1" shown in FIGS. 1A through 1E.

As is shown in FIG. 6A, a system 600 includes a main aerial vehicle 610 and a plurality of auxiliary aerial vehicles 650-1, 650-2, 650-3, 650-4, 650-5, 650-6. The auxiliary aerial vehicles 650-1, 650-2, 650-3, 650-4, 650-5, 650-6 are placed in absolute or relative positions with respect to a position of the main aerial vehicle 610. For example, as is shown in FIG. 6A, the auxiliary aerial vehicle 650-1 is positioned forward of the main aerial vehicle 610, and the auxiliary aerial vehicle 650-2 is positioned aft of the main aerial vehicle 610, e.g., along a roll axis (or x-axis) of the main aerial vehicle 610. As is further shown in FIG. 6A, the auxiliary aerial vehicle 650-3 and the auxiliary aerial vehicle 650-4 are positioned on starboard and port sides, respectively, with respect to the main aerial vehicle 610, e.g., along a pitch axis (or y-axis) of the main aerial vehicle 610. As is also shown in FIG. 6A, the auxiliary aerial vehicle 650-5 and the auxiliary aerial vehicle 650-6 are positioned above and below, respectively, the main aerial vehicle 610, e.g., along a yaw axis (or z-axis) of the main aerial vehicle 610.

The auxiliary aerial vehicles 650-1, 650-2, 650-3, 650-4, 650-5, 650-6 are thus positioned to capture information or data regarding flows of air above, below, forward of, aft of or alongside the main aerial vehicle 610. Alternatively, the auxiliary aerial vehicles 650-1, 650-2, 650-3, 650-4, 650-5, 650-6 may be placed in any positions or orientations with respect to the main aerial vehicle 610, and need not be positioned along any of the principal axes, such as is shown in FIG. 6A. Those of ordinary skill in the pertinent arts will recognize that the main aerial vehicle 610 and the auxiliary aerial vehicles 650-1, 650-2, 650-3, 650-4, 650-5, 650-6 may be programmed or configured to maintain any distance or separation between one another, and that FIG. 6A is not to scale. Additionally, the main aerial vehicle 610 and the auxiliary aerial vehicles 650-1, 650-2, 650-3, 650-4, 650-5, 650-6 may be programmed or otherwise configured to remain at fixed positions, e.g., to hover, or to travel at selected velocities.

In accordance with the present disclosure, auxiliary aerial vehicles, such as the auxiliary aerial vehicles 650-1, 650-2, 650-3, 650-4, 650-5, 650-6, may be programmed or configured to capture information or data regarding environmental conditions during the performance of one or more testing evolutions by another aerial vehicle, such as the main aerial vehicle 610. As is shown in FIG. 6B, the main aerial vehicle 610 executes a maneuver causing the main aerial vehicle 610 to vary angles of orientation with respect to one or more principal axes, e.g., about the roll axis (or x-axis), the pitch axis (or y-axis) or the yaw axis (or z-axis). The main aerial vehicle 610 may capture information regarding positions, velocities and/or orientations during the maneuver using one or more sensors. The auxiliary aerial vehicles 650-1, 650-2, 650-3, 650-4, 650-5, 650-6 may capture information or data regarding flows of air within a vicinity of the main aerial vehicle 610 during the maneuver using one or more sensors, and such information or data may be used to calculate airspeeds, angles of attack, angles of sideslip, or forces or moments acting upon the main aerial vehicle 610, or to otherwise model flow conditions above, below, forward of, aft of or alongside the main aerial vehicle 610. Information or data regarding the execution of the maneuver or any other evolutions may be captured using one or more onboard sensors provided aboard the main aerial vehicle 610 or the auxiliary aerial vehicles 650-1, 650-2, 650-3, 650-4, 650-5, 650-6 and shared therebetween. The information or data may be processed or analyzed in order to determine whether the main aerial vehicle 610 successfully completed the maneuver or other evolutions, or whether further testing, maintenance or inspection of the main aerial vehicle 610 may be required.

Figure 7A:
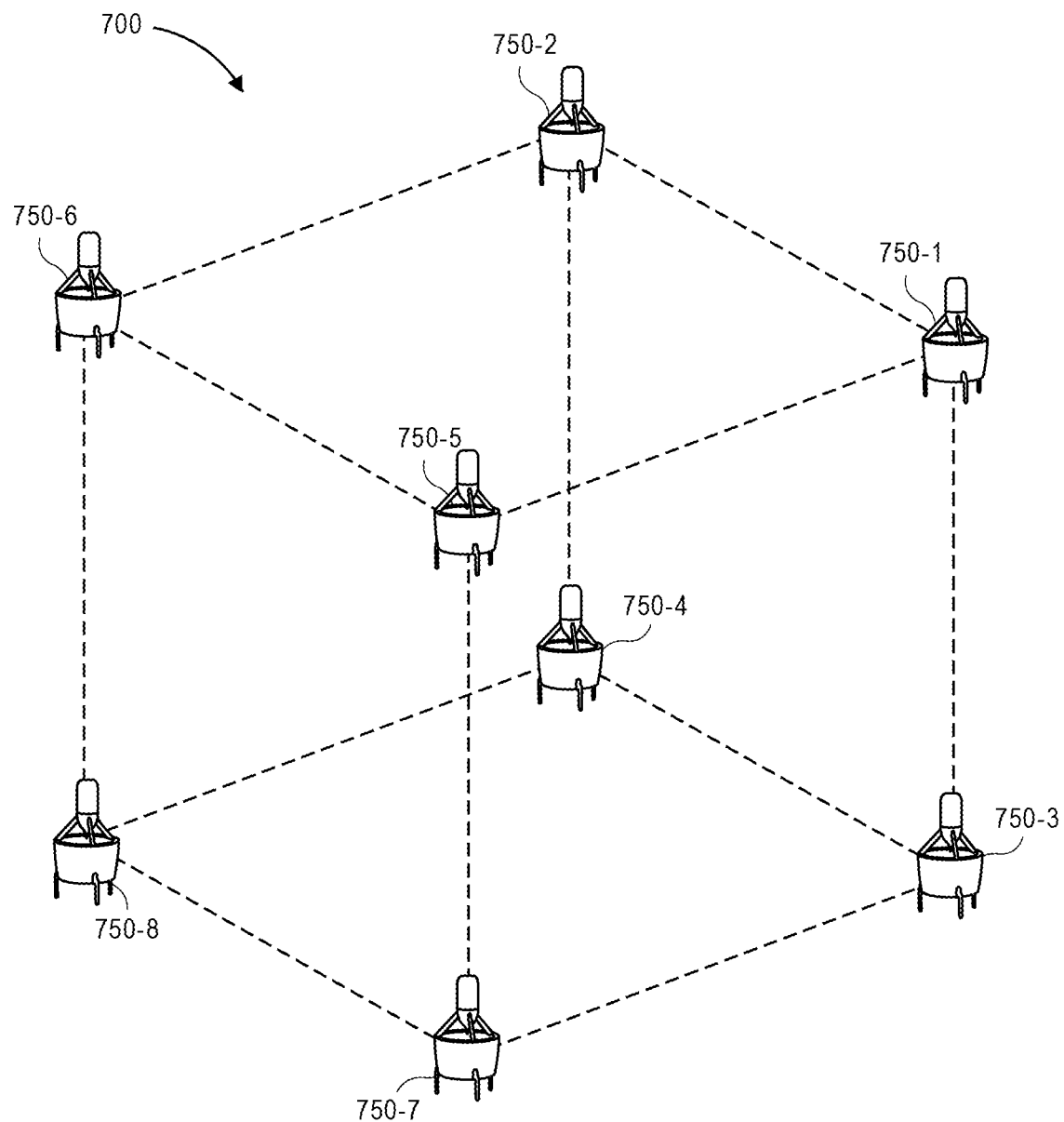
FIGS. 7A and 7B are views of aspects of one system for using auxiliary aerial vehicles for flow characterization in accordance with embodiments of the present disclosure.
Figure 7B:
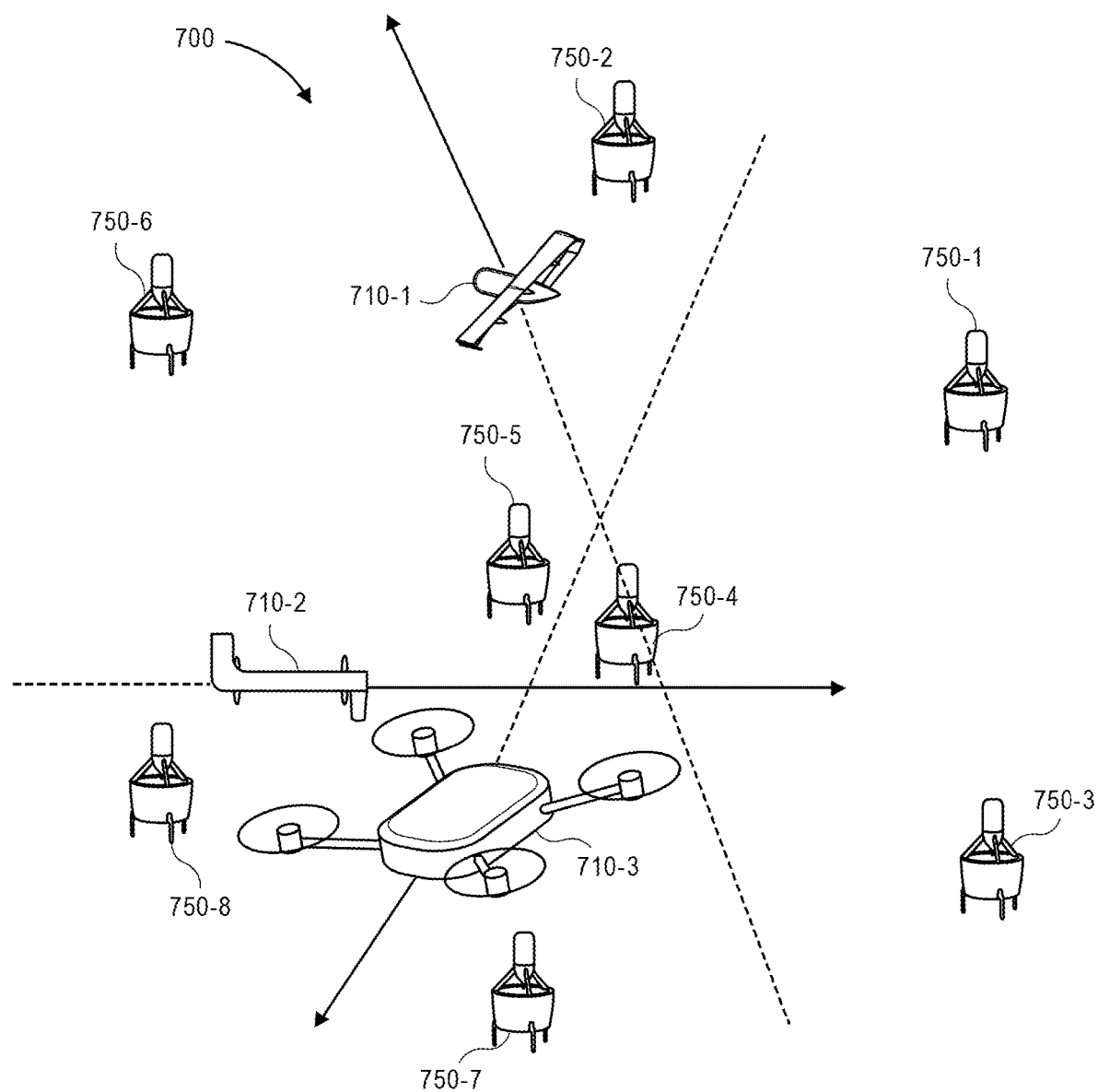

In accordance with some embodiments of the present disclosure, auxiliary aerial vehicles may be placed in specific positions in three-dimensional space in order to capture information or data regarding one or more environmental conditions during the performance of testing evolutions by other aerial vehicles, and to model or otherwise characterize the flow conditions during the performance of the testing evolutions. Referring to FIGS. 7A and 7B, views of aspects of one system for using auxiliary aerial vehicles for flow characterization in accordance with embodiments of the present disclosure are shown. Except where otherwise noted, reference numerals preceded by the number "7" shown in FIG. 7A or 7B indicate components or features that are similar to components or features having reference numerals preceded by the number "6" shown in FIG. 6A or 6B, by the number "5" shown in FIG. 5, by the number "4" shown in FIG. 4, by the number "2" shown in FIGS. 2A and 2B or by the number "1" shown in FIGS. 1A through 1E.

As is shown in FIG. 7A, a system 700 includes a plurality of auxiliary aerial vehicles 750-1, 750-2, 750-3, 750-4, 750-5, 750-6, 750-7, 750-8. The auxiliary aerial vehicles 750-1, 750-2, 750-3, 750-4, 750-5, 750-6, 750-7, 750-8 of FIG. 7A are shown in discrete positions in three-dimensional space in a formation that defines a cube. For example, each of the auxiliary aerial vehicles 750-3, 750-4, 750-7, 750-8 is in a square-shaped formation at a common altitude, with the auxiliary aerial vehicles 750-4, 750-7 at a common distance from both the auxiliary aerial vehicles 750-3, 750-8, and perpendicular to one another. Likewise, each of the auxiliary aerial vehicles 750-1, 750-2, 750-5, 750-6 is also in a square-shaped formation at a common altitude that is greater than the common altitude at which the auxiliary aerial vehicles 750-3, 750-4, 750-7, 750-8 are positioned, with the auxiliary aerial vehicles 750-2, 750-5 at a common distance from both the auxiliary aerial vehicles 750-1, 750-6, and perpendicular to one another. Moreover, each of the aerial vehicles 750-1, 750-2, 750-5, 750-6 is positioned substantially over the aerial vehicles 750-3, 750-4, 750-7, 750-8, respectively.

The cube-shaped formation shown in FIG. 7A enables the auxiliary aerial vehicles 750-1, 750-2, 750-3, 750-4, 750-5, 750-6, 750-7, 750-8 to capture information or data regarding environmental conditions for modeling the flow conditions or characteristics in three-dimensional space. For example, in some embodiments, information or data captured by sensors aboard the auxiliary aerial vehicles 750-1, 750-2, 750-3, 750-4, 750-5, 750-6, 750-7, 750-8 placed in the positions shown in FIG. 7A may be stored in one or more data stores (e.g., logged and time-stamped). The information or data captured by the auxiliary aerial vehicles 750-1, 750-2, 750-3, 750-4, 750-5, 750-6, 750-7, 750-8 may be synchronized and processed in order to generate a model of speeds and directions of air flows at such positions in space where the auxiliary aerial vehicles 750-1, 750-2, 750-3, 750-4, 750-5, 750-6, 750-7, 750-8 are located, thereby utilizing the specific biases or behaviors of the respective auxiliary aerial vehicles within the presence of such flows to construct one or more models or profiles of the flow.

As is shown in FIG. 7B, a plurality of other aerial vehicles 710-1, 710-2, 710-3 may travel through or within a vicinity of one or more of the auxiliary aerial vehicles 750-1, 750-2, 750-3, 750-4, 750-5, 750-6, 750-7, 750-8, and execute one or more testing evolutions or other procedures. Information or data captured by the other aerial vehicles and the auxiliary aerial vehicles 750-1, 750-2, 750-3, 750-4, 750-5, 750-6, 750-7, 750-8 may be used to determine whether the testing evolutions were satisfactorily completed.

Figure 8:
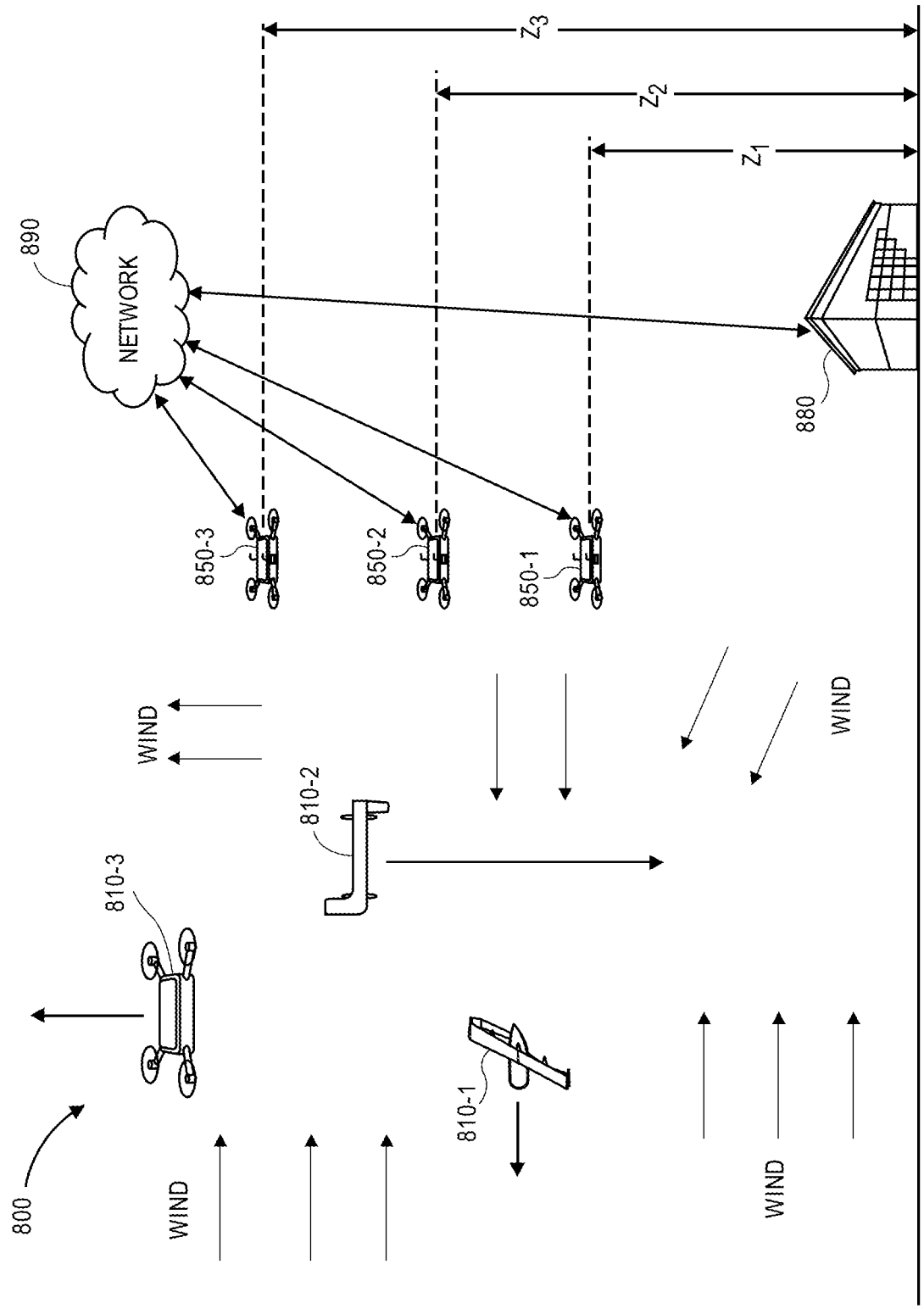
FIG. 8 is a view of aspects of one system for using auxiliary aerial vehicles for flow characterization in accordance with embodiments of the present disclosure.

Auxiliary aerial vehicles may also be utilized to capture information or data regarding flow conditions or characteristics at different altitudes, thereby enabling the modeling of gradient flow conditions as functions of altitude, in order to predict one or more airspeeds, angles of attack, angles of sideslip, or forces or moments imparted upon other aerial vehicles traveling at such altitudes, or to determine whether any adverse conditions such as wind shear may be present. Referring to FIG. 8, a view of aspects of one system for using auxiliary aerial vehicles for flow characterization in accordance with embodiments of the present disclosure is shown. Except where otherwise noted, reference numerals preceded by the number "8" shown in FIG. 8 indicate components or features that are similar to components or features having reference numerals preceded by the number "7" shown in FIG. 7A or 7B, by the number "6" shown in FIG. 6A or 6B, by the number "5" shown in FIG. 5, by the number "4" shown in FIG. 4, by the number "2" shown in FIGS. 2A and 2B or by the number "1" shown in FIGS. 1A through 1E.

As is shown in FIG. 8, a system 800 includes a plurality of auxiliary aerial vehicles 850-1, 850-2, 850-3 in communication with a facility 880 (e.g., a take-off or landing facility) over a network 890, which may include the Internet in whole or in part. The auxiliary aerial vehicle 850-1 is at an altitude $z_1$, while the auxiliary aerial vehicle 850-2 is at an altitude $z_2$, and the auxiliary aerial vehicle 850-3 is at an altitude $z_3$. The auxiliary aerial vehicles 850-1, 850-2, 850-3 may be outfitted with one or more sensors for capturing information or data regarding environmental conditions at such altitudes $z_1$, $z_2$, $z_3$.

The system 800 further includes a plurality of main aerial vehicles 810-1, 810-2, 810-3 that are operating at any selected positions, altitudes and/or velocities. Thus, the auxiliary aerial vehicles 850-1, 850-2, 850-3 may be used to capture information or data for modeling the flow of air within a vicinity of the facility 880, which may be provided for any purpose relating to the operation of aerial vehicles, or for any other purpose. The main aerial vehicles 810-1, 810-2, 810-3 may utilize one or more models of the flow of air for any reason, such as to safely navigate within a vicinity of the facility 880, e.g., to safely take off or land, or for contact avoidance.

Figure 9:
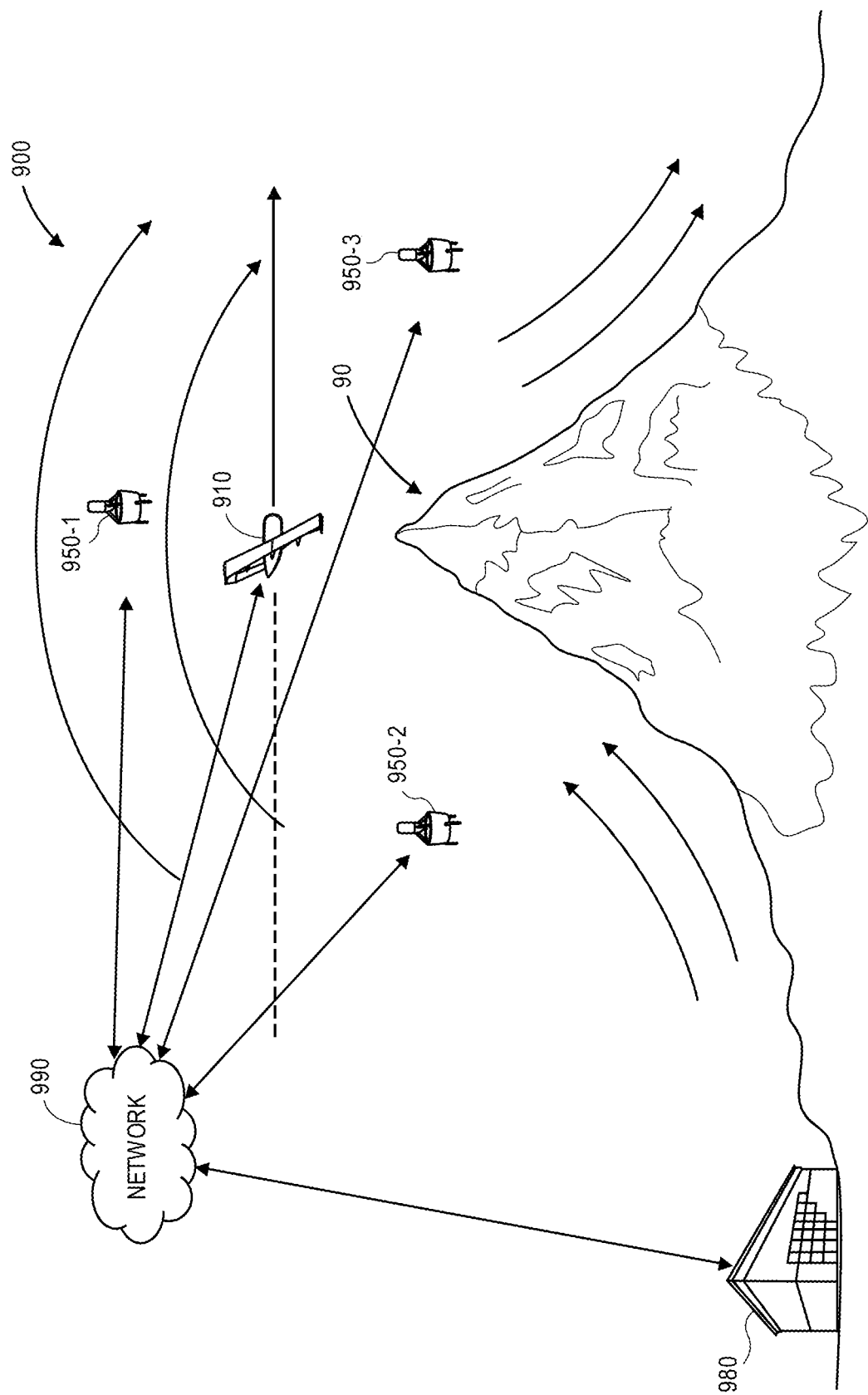
FIG. 9 is a view of aspects of one system for using auxiliary aerial vehicles for flow characterization in accordance with embodiments of the present disclosure.

Referring to FIG. 9, a view of aspects of one system for using auxiliary aerial vehicles for flow characterization in accordance with embodiments of the present disclosure is shown. Except where otherwise noted, reference numerals preceded by the number "9" shown in FIG. 9 indicate components or features that are similar to components or features having reference numerals preceded by the number "8" shown in FIG. 8, by the number "7" shown in FIG. 7A or 7B, by the number "6" shown in FIG. 6A or 6B, by the number "5" shown in FIG. 5, by the number "4" shown in FIG. 4, by the number "2" shown in FIGS. 2A and 2B or by the number "1" shown in FIGS. 1A through 1E.

As is shown in FIG. 9, a system 900 includes a plurality of auxiliary aerial vehicles 950-1, 950-2, 950-3 in communication with a facility 980 (e.g., a take-off or landing facility) over a network 990, which may include the Internet in whole or in part. The auxiliary aerial vehicle 950-1 is operating above a natural land form 90 (e.g., a mountain or hill), while the auxiliary aerial vehicle 950-2 is operating on a windward side of the natural land form 90, and the auxiliary aerial vehicle 950-3 is operating on a leeward side of the natural land form 90. The auxiliary aerial vehicles 950-1, 950-2, 950-3 may be outfitted with one or more sensors for capturing information or data regarding environmental conditions above or on either side of the natural land form 90. Alternatively, the auxiliary aerial vehicles 950-1, 950-2, 950-3 may operate in selected positions above, alongside or otherwise with respect to a building or other structure, and may be outfitted with one or more sensors for capturing information or data regarding environmental conditions above or on one or more sides of the building or other structure.

The system 900 further includes a main aerial vehicle 910 traveling over the natural land form 90, e.g., at one or more selected positions, altitudes and/or velocities. Thus, the auxiliary aerial vehicles 950-1, 950-2, 950-3 may be used to capture information or data for modeling the flow of air over the natural land form 90. The main aerial vehicle 910 may utilize one or more models of the flow of air generated based on the information or data captured by the auxiliary aerial vehicles 950-1, 950-2, 950-3 for any reason, such as to safely navigate within a vicinity of the facility 980, e.g., to ensure that the main aerial vehicle 910 may safely navigate over the natural land form 90 in view of the flow of air that may be present above or on either side of the natural land form 90.

Figure 10A:
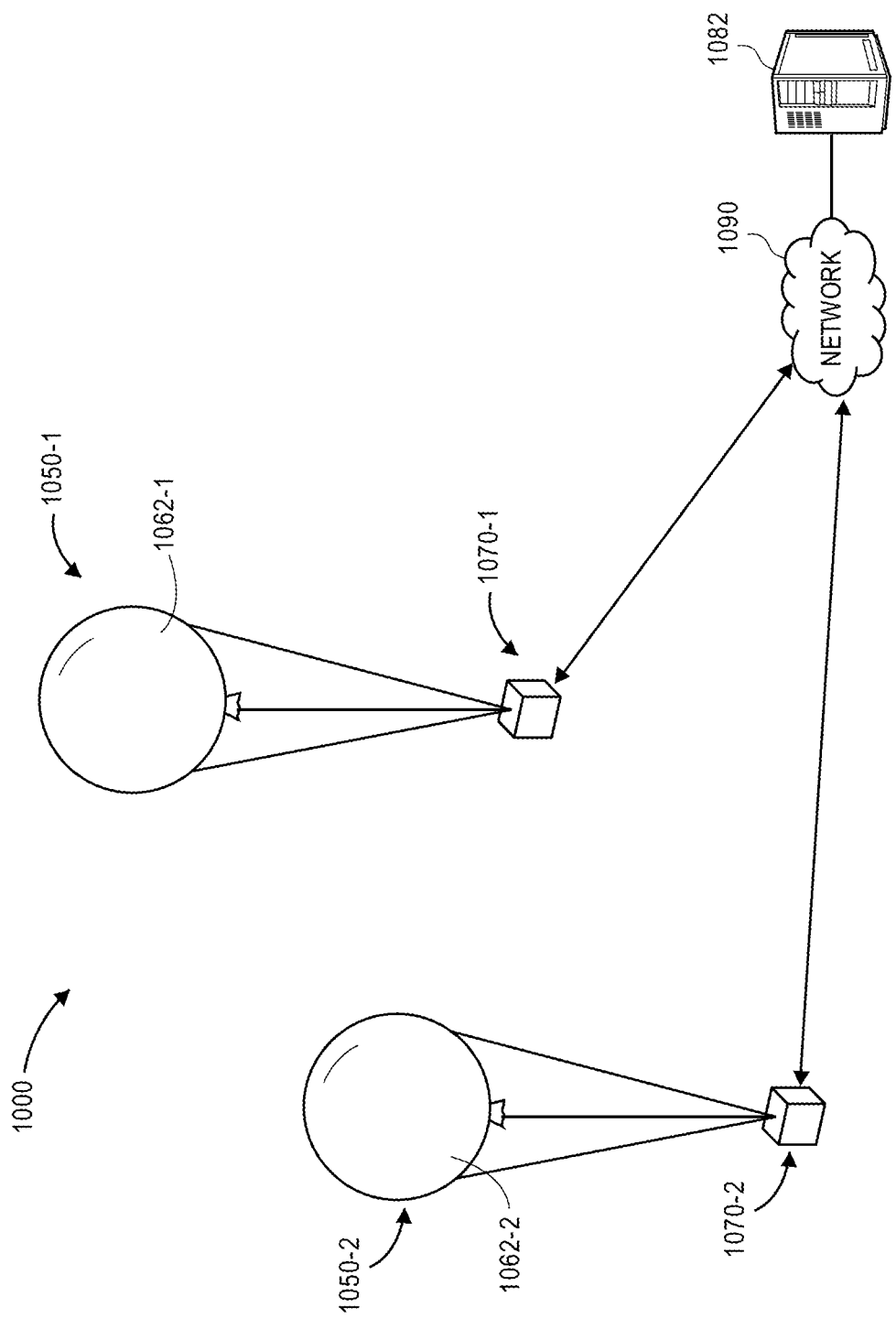
Figure 10C:
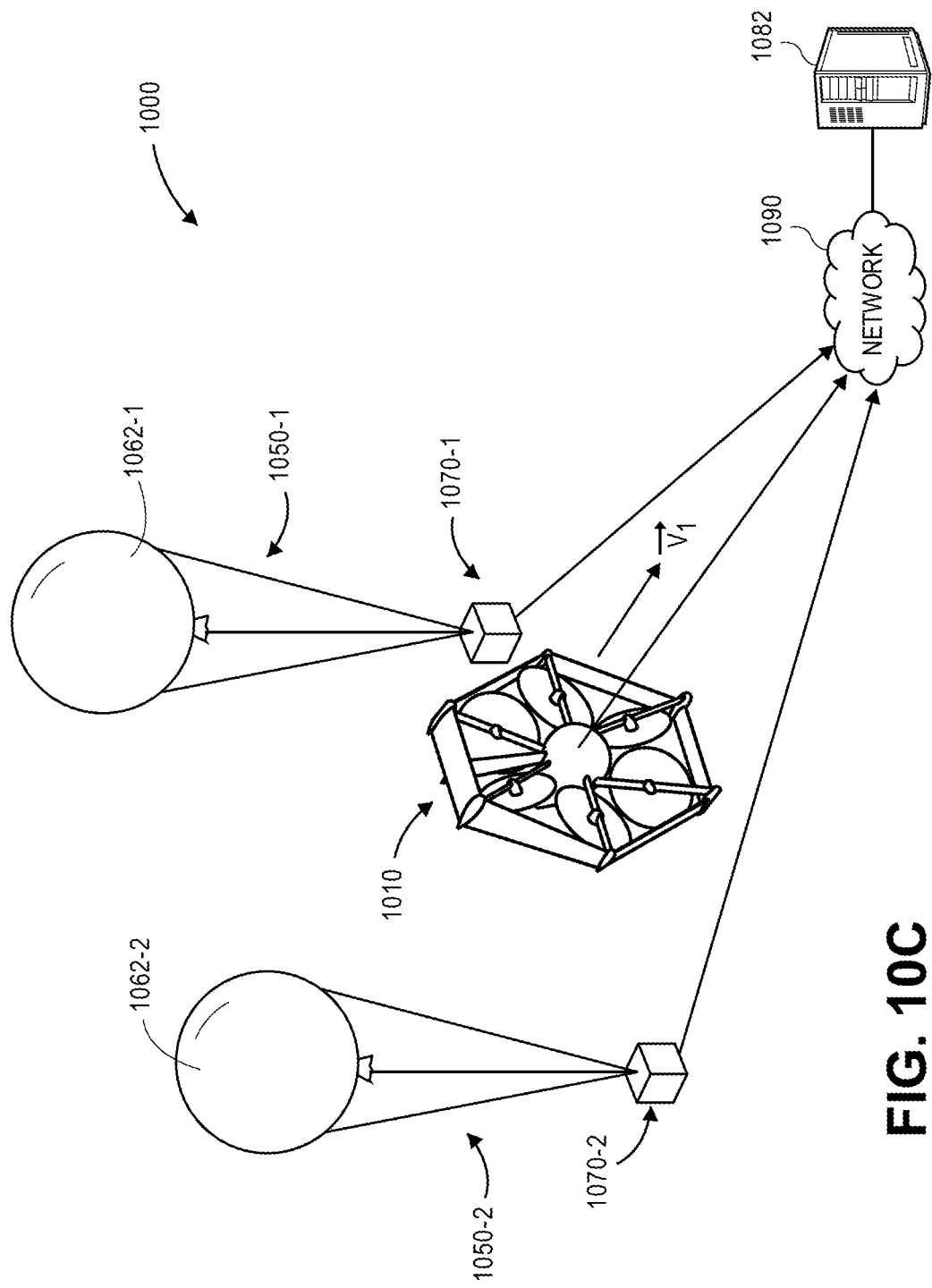

An auxiliary aerial vehicle outfitted with one or more sensors for capturing information or data regarding environmental conditions within a vicinity of one or more other aerial vehicles, or for modeling or otherwise characterizing flow conditions, may take any form. Referring to FIGS. 10A through 10C, views of aspects of one system for using auxiliary aerial vehicles for flow characterization in accordance with embodiments of the present disclosure are shown. Except where otherwise noted, reference numerals preceded by the number "10" shown in FIG. 10A, 10B or 10C indicate components or features that are similar to components or features having reference numerals preceded by the number "9" shown in FIG. 9, by the number "8" shown in FIG. 8, by the number "7" shown in FIG. 7A or 7B, by the number "6" shown in FIG. 6A or 6B, by the number "5" shown in FIG. 5, by the number "4" shown in FIG. 4, by the number "2" shown in FIGS. 2A and 2B or by the number "1" shown in FIGS. 1A through 1E.

As is shown in FIG. 10A, the system 1000 includes a pair of auxiliary aerial vehicles 1050-1, 1050-2 in communication with a server 1082 and with one another over a network 1090, which may include the Internet in whole or in part. The auxiliary aerial vehicles 1050-1, 1050-2 are in the form of hot-air balloons having envelopes 1062-1, 1062-2 with isolated volumes of air. The auxiliary aerial vehicles 1050-1, 1050-2 further include baskets or other suspended compartments 1070-1, 1070-2 having one or more sensors (e.g., airspeed sensors, barometers or the like). Altitudes of the auxiliary aerial vehicles 1050-1, 1050-2 may be selected by selectively varying densities of the isolated volumes of air within the envelopes 1062-1, 1062-2 with respect to a density of the air within a vicinity of the auxiliary aerial vehicles 1050-1, 1050-2.

As is shown in FIG. 10B, a main aerial vehicle 1010 may be programmed or configured to operate within a vicinity of the auxiliary aerial vehicles 1050-1, 1050-2, e.g., by traveling at a selected velocity $V_1$.

As is shown in FIG. 10C, the auxiliary aerial vehicles 1050-1, 1050-2 may further transmit information or data captured by the sensors included in the one or more compartments 1070-1, 1070-2 regarding its operations to the server 1082 over the network 1090, e.g., by one or more transceivers. The server 1082 may process the information or data captured by the auxiliary aerial vehicles 1050-1, 1050-2 to generate one or more models of flow conditions during the operation of the main aerial vehicle 1010. Likewise, the main aerial vehicle 1010 may transmit information or data captured by one or more onboard sensors regarding its operations in the presence of such flow to the server 1082 over the network 1090, e.g., by one or more transceivers. The server 1082 may determine whether the operations of the main aerial vehicle 1010 are satisfactory based on the models of the flow conditions and the information or data captured by the one or more onboard sensors, or any other information or data.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale. In particular, the one or more maps or other cartographic representations of energy levels are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
   selecting a position in three-dimensional space for each of a plurality of auxiliary aerial vehicles, wherein each of the plurality of auxiliary aerial vehicles is outfitted with an airspeed sensor;
   causing each of the plurality of auxiliary aerial vehicles to be positioned in the selected positions;
   causing a main aerial vehicle to execute at least one evolution at a first position in three-dimensional space at a first time, wherein the at least one evolution comprises:
      starting or stopping at least one propulsion motor of the main aerial vehicle;
      causing the main aerial vehicle to remain in the first position in three-dimensional space at the first time;
      operating the at least one propulsion motor of the main aerial vehicle at a selected speed;
      operating at least one control surface of the main aerial vehicle by a selected angular extent; or
      extending or retracting at least one appurtenance of the main aerial vehicle by a selected distance;
   capturing, with each of the plurality of auxiliary aerial vehicles in the selected positions at the first time, data regarding a flow of air during an interval of time, wherein the interval of time includes the first time;
   generating a model of the flow of air on the main aerial vehicle during the interval of time based at least in part on the data captured by each of the plurality of auxiliary aerial vehicles; and
   determining that the at least one evolution was satisfactorily executed by the main aerial vehicle based at least in part on the model of the flow of air on the main aerial vehicle during the interval of time.

2. The method of claim 1, wherein the main aerial vehicle has at least one of a first roll angle, a first pitch angle, a first yaw angle or a first velocity prior to the first time, and
   wherein causing the main aerial vehicle to execute the at least one evolution comprises:
      causing the main aerial vehicle to have at least one of a second roll angle, a second pitch angle, a second yaw angle or a second velocity after the first time.

3. The method of claim 1, wherein determining that the at least one evolution was satisfactorily executed comprises:
   determining at least one of an airspeed of the flow of air, an angle of attack of the main aerial vehicle at the first time, an angle of sideslip of the main aerial vehicle at the first time, a force acting upon the main aerial vehicle at the first time or a moment acting upon the main aerial vehicle at the first time based at least in part on the model of flow.

4. The method of claim 1, wherein determining that the at least one evolution was satisfactorily executed by the main aerial vehicle comprises:
   generating an aerodynamic model of the main aerial vehicle based at least in part on the data regarding the flow of air during the interval of time and the model of the flow of air on the main aerial vehicle during the interval of time; and
   determining that the aerodynamic model of the main aerial vehicle complies with at least one predetermined standard.

5. A method comprising:
   causing a first aerial vehicle to perform a first evolution at a first time, wherein the first aerial vehicle is airborne in at least a first position in three-dimensional space at the first time;
   determining, by at least a first sensor aboard the first aerial vehicle, first data regarding the first evolution at the first time;
   capturing, by at least a second sensor aboard a second aerial vehicle, second data regarding air flow during an interval of time, wherein the second aerial vehicle is airborne in at least a second position in three-dimensional space at the first time, wherein the second position is within a vicinity of the first position, and wherein the interval of time comprises the first time;
   generating a model of the air flow based at least in part on the second data;
   determining information regarding the performance of the first evolution by the first aerial vehicle at the first time based at least in part on the first data and the model of the air flow; and
   storing at least some of the information regarding the performance of the first evolution by the first aerial vehicle at the first time in at least one data store,
   wherein the at least some of the information indicates whether the first aerial vehicle satisfactorily performed the first evolution.

6. A method comprising:
   causing a first aerial vehicle to perform a first evolution at a first time, wherein the first aerial vehicle is airborne in at least a first position in three-dimensional space at the first time;
   determining, by at least a first sensor aboard the first aerial vehicle, first data regarding the first evolution at the first time;
   capturing, by at least a second sensor aboard a second aerial vehicle, second data regarding air flow during an interval of time, wherein the second aerial vehicle is airborne in at least a second position in three-dimensional space at the first time, wherein the second position is within a vicinity of the first position, and wherein the interval of time comprises the first time;
   generating a model of the air flow based at least in part on the second data;
   generating a first aerodynamic model of the first aerial vehicle based at least in part on the first data and the model of the air flow;
   determining that the first aerodynamic model of the first aerial vehicle complies with at least one predetermined standard; and
   storing information regarding the performance of the first evolution by the first aerial vehicle at the first time in at least one data store,
   wherein the information regarding the performance of the first evolution by the first aerial vehicle at the first time comprises an indication that the first aerodynamic model of the first aerial vehicle complies with the at least one predetermined standard.

7. The method of claim 6, wherein determining that the first aerodynamic model of the first aerial vehicle complies with the at least one predetermined standard comprises:
   identifying a second aerodynamic model prior to the first time, wherein the second aerodynamic model is generated for at least one of a class of aerial vehicles including the first aerial vehicle; and
   determining that the first aerodynamic model corresponds to the second aerodynamic model.

8. A method comprising:
   causing a first aerial vehicle to perform a first evolution at a first time, wherein the first aerial vehicle is airborne in at least a first position in three-dimensional space at the first time;

determining, by at least a first sensor aboard the first aerial vehicle, first data regarding the first evolution at the first time;
capturing, by at least a second sensor aboard a second aerial vehicle, second data regarding air flow during an interval of time, wherein the second aerial vehicle is airborne in at least a second position in three-dimensional space at the first time, wherein the second position is within a vicinity of the first position, and wherein the interval of time comprises the first time;
generating a model of the air flow based at least in part on the second data;
determining information regarding the performance of the first evolution by the first aerial vehicle at the first time based at least in part on the first data and the model of the air flow, wherein the information regarding the performance of the evolution by the first aerial vehicle comprises at least one of:
an airspeed of the air flow at the first time, an angle of attack of the first aerial vehicle at the first time, an angle of sideslip of the first aerial vehicle at the first time, a force acting upon the first aerial vehicle at the first time or a moment acting upon the first aerial vehicle at the first time determined based at least in part on the model;
storing at least some of the information regarding the performance of the first evolution by the first aerial vehicle at the first time in at least one data store; and
determining that the first evolution was satisfactorily executed based at least in part on the at least one of the airspeed of the air flow at the first time, the angle of attack of the first aerial vehicle at the first time, the angle of sideslip of the first aerial vehicle at the first time, the force acting upon the first aerial vehicle at the first time or the moment acting upon the first aerial vehicle at the first time.

9. A method comprising:
causing a first aerial vehicle to perform a first evolution at a first time, wherein the first aerial vehicle is airborne in at least a first position in three-dimensional space at the first time;
determining, by at least a first sensor aboard the first aerial vehicle, first data regarding the first evolution at the first time, wherein the first sensor comprises at least one motion sensor;
capturing, by at least a second sensor aboard a second aerial vehicle, second data regarding air flow during an interval of time, wherein the second aerial vehicle is airborne in at least a second position in three-dimensional space at the first time, wherein the second position is within a vicinity of the first position, and wherein the interval of time comprises the first time;
generating a model of the air flow based at least in part on the second data;
determining information regarding the performance of the first evolution by the first aerial vehicle at the first time based at least in part on the first data and the model of the air flow, wherein the first data regarding the first evolution at the first time comprises at least one of a roll angle, a yaw angle, a pitch angle or an angular velocity of the first aerial vehicle at the first time determined by the at least one motion sensor; and
storing at least some of the information regarding the performance of the first evolution by the first aerial vehicle at the first time in at least one data store.

10. A method comprising:
causing a first aerial vehicle to perform a first evolution at a first time, wherein the first aerial vehicle is airborne in at least a first position in three-dimensional space at the first time;
determining, by at least a first sensor aboard the first aerial vehicle, first data regarding the first evolution at the first time;
capturing, by at least a second sensor aboard a second aerial vehicle, second data regarding air flow during an interval of time, wherein the second aerial vehicle is airborne in at least a second position in three-dimensional space at the first time, wherein the second position is within a vicinity of the first position, and wherein the interval of time comprises the first time;
capturing, by at least a third sensor aboard a third aerial vehicle, third data regarding air flow during the interval of time, wherein the third aerial vehicle is airborne in at least a third position in three-dimensional space at the first time, and wherein the third position is within a vicinity of the first position;
generating a model of the air flow based at least in part on the second data and the third data;
determining information regarding the performance of the first evolution by the first aerial vehicle at the first time based at least in part on the first data and the model of the air flow; and
storing at least some of the information regarding the performance of the first evolution by the first aerial vehicle at the first time in at least one data store.

11. The method of claim 10, wherein the second position is at a first altitude,
wherein the third position is at a second altitude, and
wherein the model is a flow gradient of air flow with respect to altitude.

12. The method of claim 11, further comprising:
selecting at least the second position and the third position based at least in part on at least one of a natural land mass or a ground-based structure.

13. A method comprising:
selecting a position in three-dimensional space for each of a plurality of aerial vehicles;
causing each of the plurality of aerial vehicles to proceed to the selected positions;
causing a first aerial vehicle to perform a first evolution at a first time, wherein the first aerial vehicle is airborne in at least a first position in three-dimensional space at the first time, wherein each of the selected positions is within a vicinity of the first position, and wherein the first aerial vehicle is not one of the plurality of vehicles;
determining, by at least a first sensor aboard the first aerial vehicle, first data regarding the first evolution at the first time;
capturing, by at least one sensor aboard each of the plurality of aerial vehicles, data regarding air flow during an interval of time, wherein each of the plurality of aerial vehicles is airborne within a vicinity of the selected positions during the interval of time, and wherein the interval of time comprises the first time;
generating a model of the air flow based at least in part on at least some of the data captured by the at least one sensor aboard each of the plurality of aerial vehicles;
determining information regarding the performance of the first evolution by the first aerial vehicle at the first time based at least in part on the first data and the model of the air flow; and storing at least some of the information regarding the performance of the first evolution by the first aerial vehicle at the first time in at least one data store.

14. A method of comprising:
causing a first aerial vehicle to perform a first evolution at a first time, wherein the first aerial vehicle is airborne in at least a first position in three-dimensional space at the first time;
determining, by at least a first sensor aboard the first aerial vehicle, first data regarding the first evolution at the first time;
capturing, by at least a second sensor aboard a second aerial vehicle, second data regarding air flow during an interval of time, wherein the second aerial vehicle is airborne in at least a second position in three-dimensional space at the first time, wherein the second position is within a vicinity of the first position, and wherein the interval of time comprises the first time;
generating a model of the air flow based at least in part on the second data;
determining information regarding the performance of the first evolution by the first aerial vehicle at the first time based at least in part on the first data and the model of the air flow;
storing at least some of the information regarding the performance of the first evolution by the first aerial vehicle at the first time in at least one data store;
causing a third aerial vehicle to perform a second evolution at a second time, wherein the third aerial vehicle is airborne in at least a third position in three-dimensional space at the second time;
determining, by at least a third sensor aboard the third aerial vehicle, third data regarding the second evolution at the second time;
determining information regarding the performance of the second evolution by the third aerial vehicle at the second time based at least in part on the third data and the model of the air flow; and
storing at least some of the information regarding the performance of the second evolution by the third aerial vehicle at the second time in the at least one data store.

15. A system comprising:
a first aerial vehicle comprising a first computer device, a first motion sensor, a first airspeed sensor and a first transceiver; and
a second aerial vehicle comprising a second airspeed sensor and a second transceiver,
wherein the first aerial vehicle is in communication with at least the second aerial vehicle, and
wherein the first computer device is programmed with executable instructions that, when executed, cause the first computer device to perform a method comprising:
causing the first aerial vehicle to execute a first evolution at a first time, wherein the first aerial vehicle is at a first position in three-dimensional space at the first time, and wherein the first evolution requires operation of at least one of a first propulsion motor, a first control surface or a first appurtenance of the first aerial vehicle;
determining, by at least the first motion sensor, first information regarding an orientation of the first aerial vehicle during an interval of time, wherein the first time is within the interval time;
receiving second information regarding an air flow at a second position in three-dimensional space during the interval of time from the second aerial vehicle, wherein the second information comprises at least one speed and at least one direction of the air flow at the second position during the interval of time, and wherein the second position is within a vicinity of the first position; and
determining, based at least in part on the first information and the second information, that the first evolution was satisfactorily executed.

16. The system of claim 15, wherein the first evolution comprises maintaining the first aerial vehicle at a selected velocity, on a selected course or at a selected altitude,
wherein the first information comprises at least one speed and at least one direction of the air flow sensed by the first airspeed sensor, and
wherein determining that the first evolution was satisfactorily executed comprises:
determining that the first aerial vehicle remained at the selected velocity, on the selected course or at the selected altitude during the interval of time based at least in part on the first information and the second information.

17. The system of claim 15, wherein the first aerial vehicle is in motion during the interval of time, and
wherein the second aerial vehicle is stationary at the first time.

18. The system of claim 15, wherein the method further comprises:
generating a model of air flow over the first aerial vehicle at the first time based at least in part on the second information; and
determining at least one of an airspeed of the air flow at the first time, an angle of attack of the first aerial vehicle at the first time, an angle of sideslip of the first aerial vehicle at the first time, a force acting upon the first aerial vehicle at the first time or a moment acting upon the first aerial vehicle at the first time based at least in part on the model,
wherein that the first evolution was satisfactorily executed is determined based at least in part on the at least one of the airspeed of the air flow at the first time, the angle of attack of the first aerial vehicle at the first time, the angle of sideslip of the first aerial vehicle at the first time, the force acting upon the first aerial vehicle at the first time or the moment acting upon the first aerial vehicle at the first time.

19. The system of claim 18, further comprising a third aerial vehicle having at least a third airspeed sensor, wherein the first aerial vehicle is in communication with at least the second aerial vehicle and the third aerial vehicle, and
wherein the method further comprises:
receiving third information regarding an air flow at a third position in three-dimensional space during the interval of time from the third aerial vehicle, wherein the third information comprises at least one speed and at least one direction of the air flow at the third position during the interval of time, and wherein the third position is within a vicinity of the first position,
wherein the model is generated based at least in part on the second information and the third information.

20. The system of claim 15, wherein determining that the first evolution was satisfactorily executed comprises:
generating an aerodynamic model of the first aerial vehicle based at least in part on the first information and the second orientation; and
determining that the aerodynamic model of the first aerial vehicle complies with at least one predetermined standard.

* * * * *